United States Patent [19]

Nakajima et al.

[11] Patent Number: 5,428,217
[45] Date of Patent: Jun. 27, 1995

[54] ANNULAR PHOTODIODE FOR USE IN AN OPTICAL ROTARY ENCODER

[75] Inventors: Hajime Nakajima; Masahiro Shikai, both of Hyogo, Japan

[73] Assignee: Mitsubishi Denki Kabushiki Kaisha, Tokyo, Japan

[21] Appl. No.: 130,874

[22] Filed: Oct. 4, 1993

[30] Foreign Application Priority Data

Nov. 27, 1992 [JP] Japan ................................. 4-339565
Dec. 18, 1992 [JP] Japan ................................. 4-354874
Jul. 5, 1993 [JP] Japan ................................. 5-165681

[51] Int. Cl.⁶ ............................................. H01J 40/14
[52] U.S. Cl. ........................... 250/214.1; 250/214 PR; 250/231.13
[58] Field of Search ........... 250/214.1, 214 PR, 338.4, 250/370.01, 370.08, 370.11, 332, 231.13; 257/465

[56] References Cited

U.S. PATENT DOCUMENTS 3,129,416 4/1964 Freedman ............................ 340/263
4,760,436 7/1988 Yi Zi ..................................... 357/30

FOREIGN PATENT DOCUMENTS 5-647 1/1993 Japan.

OTHER PUBLICATIONS

Shadan Hojin, "Optical Application Technique 1991, III-1", *Optoelectro-mechanics Association*, Apr. 30, 1991, pp. 16-17.
M. Idesawa, "Multi-Resolution Position Sensing with R-HPSD Scheme and Surface Shape Measuring Method", *The 3rd Robot Senser Symposium*, Yunnan Institute of Technology, Jan. 17-18, 1992, pp. 123-128.

*Primary Examiner*—David C. Nelms
*Assistant Examiner*—Steven L. Nichols
*Attorney, Agent, or Firm*—Burns, Doane, Swecker & Mathis

[57] ABSTRACT

The present invention relates to an optical rotary encoder for detecting a position optically. In the optical rotary encoder of the invention, a light beam reflected by a half mirror enters a deflector, whereby it is reflected while being deflected in a certain direction. The reflected light beam again enters the half mirror. Transmitted light from the half mirror enters a position detector, in which a light spot is formed on an annular photodiode. The path of the reflected light from the deflector forms a cone having a vertical angle which is twice the angle of deflection of the deflector. The position detector is disposed perpendicularly to the optical axis of the reflected light in the case of the deflection angle being 0° and with the center of the annular photodiode made coincident with the said optical axis. A suitable distance between the deflector and the photodiode is selected so that a light spot is radiated onto the photodiode. The position of the light spot formed on the annular photodiode is in a corresponding relation to a rotational angle of a rotating shaft. The position detector detects the position of the light spot to detect such rotational angle.

4 Claims, 25 Drawing Sheets

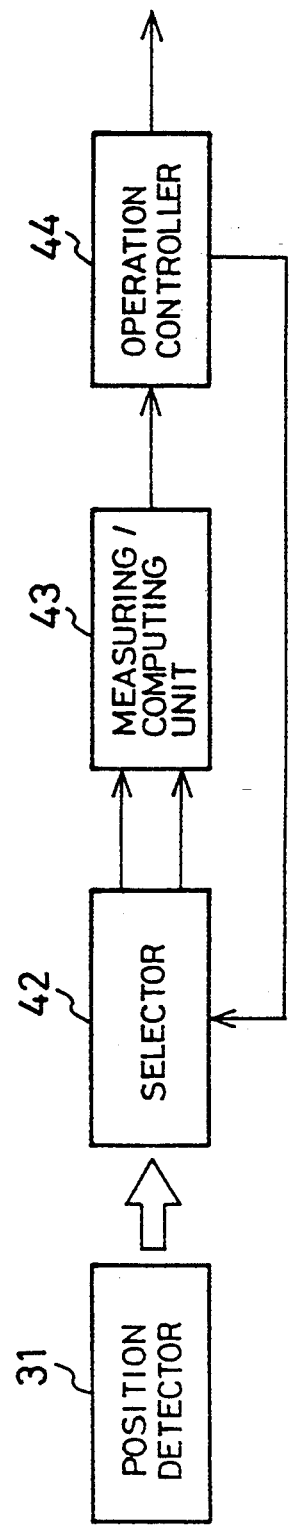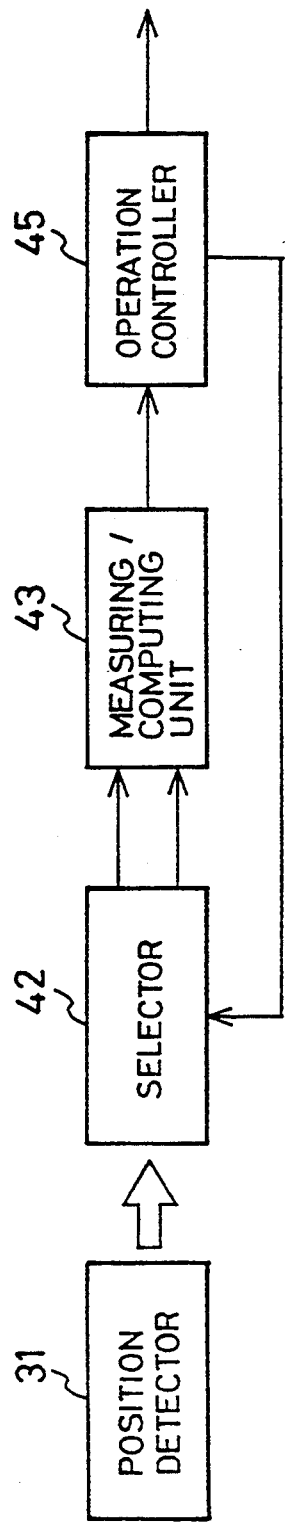

FIG.12(a)
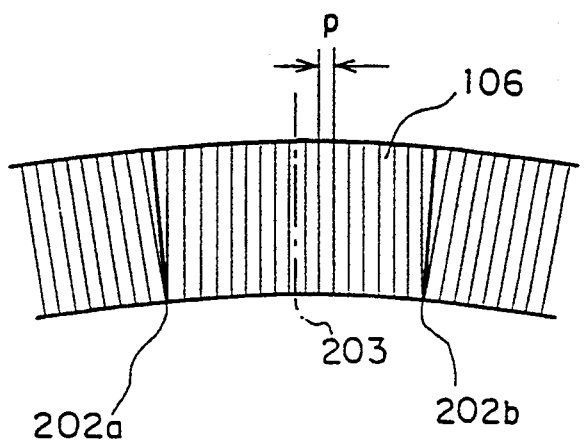
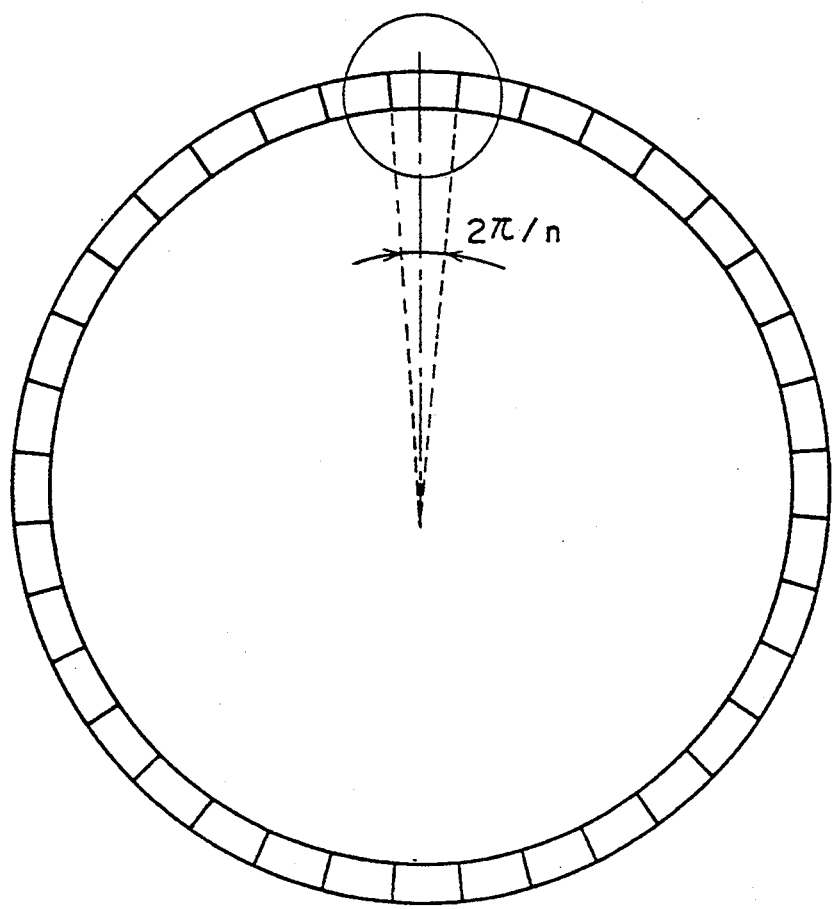
FIG.12(b)

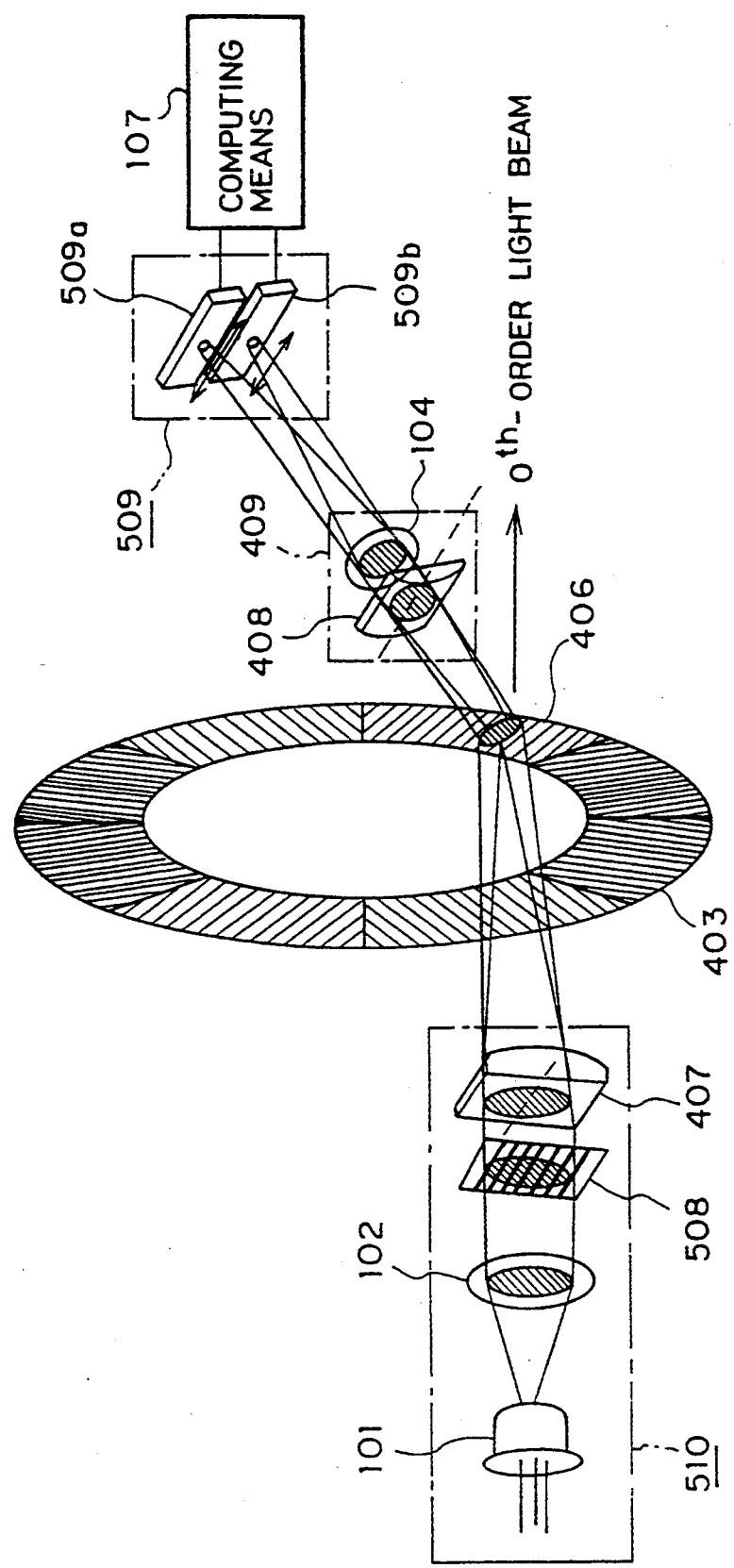

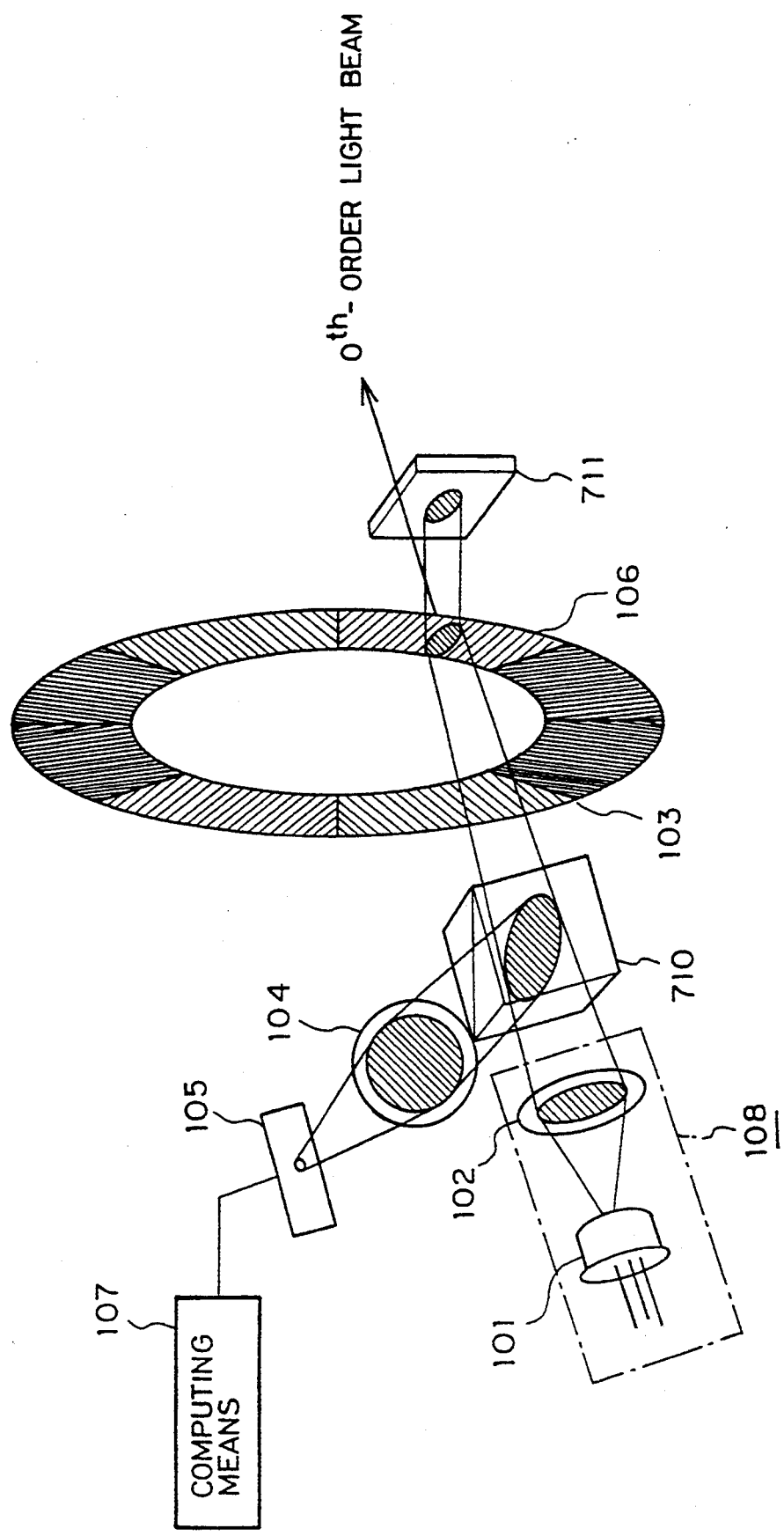

FIG.27
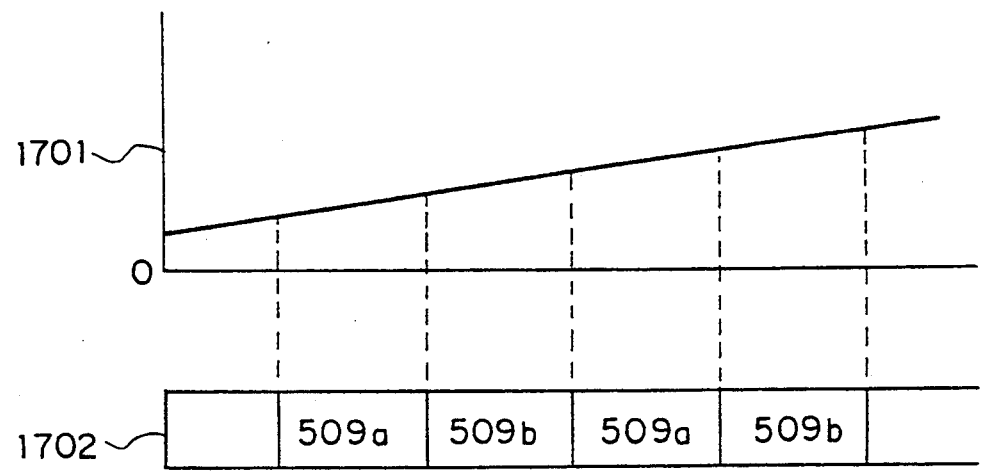
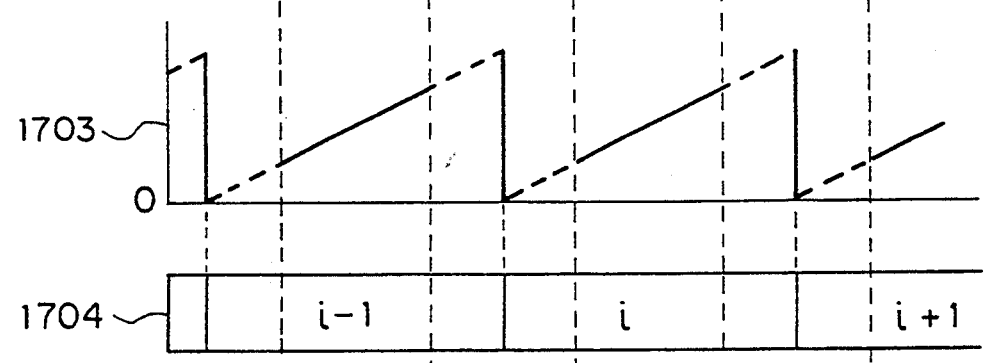
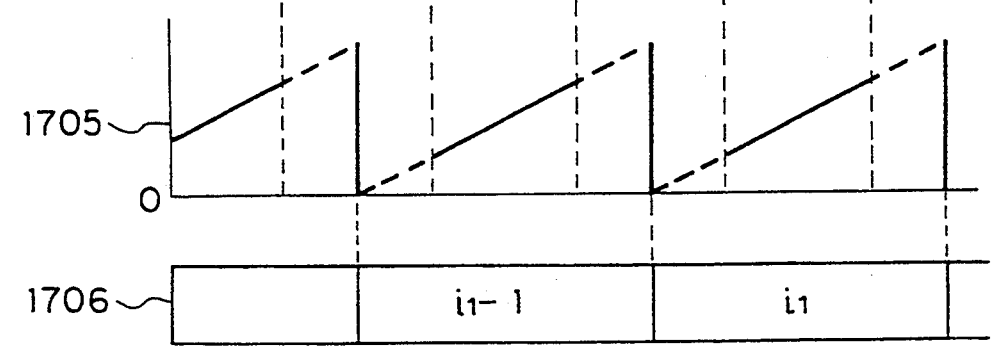

ANNULAR PHOTODIODE FOR USE IN AN OPTICAL ROTARY ENCODER

BACKGROUND OF THE INVENTION

1. Field of the Invention

The present invention relates to a position detector using a semiconductor, a position detecting method using the same, and an optical rotary encoder, for detecting an incident position of a light spot which moves while describing an annular path.

2. Description of the Prior Art

FIG. 1 is a sectional view showing a conventional position detector. In the same figure, the reference numeral 1 denotes a photodiode which is in the shape of a flat plate, and numerals 2, 3 and 4 denote P, I and N layers, respectively, of the photodiode. Numerals 5a and 5b denote electrodes provided at both ends of the P layer 2 which is a surface layer, and numerals 6a and 6b denote output terminals extending from those electrodes. Numeral 7 denotes a bias electrode attached to the N layer 4 which constitutes the back of the photodiode. Numeral 8 denotes light which is incident on the photodiode 1, and numerals 9a and 9b denote photocurrents generated by the light 8.

The operation of such conventional position detector will now be described. Upon incidence of light 8 on the flat plate-like photodiode 1 in a certain position, an electric charge proportional to the energy of the light 8 is generated in the incident position. The electric charge thus generated passes through the P layer 2 as photocurrents 9a and 9b, which currents are outputted from the electrodes 5a and 5b, respectively. The electric charge in the incident position of the light 8 is divided into electric currents to both electrodes 5a and 5b in inverse proportion to resistance values of the P layer 2 portions up to the electrodes 5a and 5b, respectively. Since the P layer 2 is formed so as to be uniform in resistance value throughout the whole surface thereof, the division of current is inversely proportional to the distance from the incident position of the light 8 up to each of the electrodes 5a and 5b. Therefore, if the electric currents outputted from the electrodes 5a and 5b to the output terminals 6a and 6b are Ia and Ib, respectively, the spacing between the electrodes 5a and 5b is L, and the incident position of the light 8 with respect to the middle point between both electrodes which is assumed to be an origin, is X, the incident position of the light 8 can be detected in accordance with the following equation:

$$(Ia - Ib)/(Ia + Ib) = 2X/L \quad (1)$$

FIG. 2 shows the structure of another conventional position detector, which is described on page 125 of a collection of drafts for "The Third Robot Sensor Symposium" (1992). In the same figure, the numeral 11 denotes a flat plate-like photodiode which corresponds to the photodiode 1 in FIG. 1. Numeral 12 denotes a resistor serving as a dividing resistor, which is formed in parallel with the photodiode 11. Numeral 13 denotes an electrically conductive layer projecting onto the photodiode 11 at equal intervals like the teeth of a comb, and numeral 14 denotes an output electrode drawn out from the resistor 12, the output electrode 14 being provided in a plural number.

The operation of this position detector is basically the same as the position detector illustrated in FIG. 1, provided a difference is recognized in the following point. A photocurrent generated by the incidence of a light spot is conducted to the resistor 12 by means of the conductive layer 13 projecting onto the photodiode 11, whereby variations in the resistance value of the photodiode 11 are absorbed. A section area corresponding to the incidence of the light spot is selected on the basis of current values detected in the output electrodes 14 located at both ends and an incident position of the light spot is specified on the basis of current values in the output electrodes 14 disposed at both ends of the selected section area.

The following description is now provided about an optical rotary encoder. FIG. 3 is a diagram showing the construction of a conventional optical rotary encoder which is shown, for example, in "Optical Application Technique 1991, III-1" (Shadan Hojin: Optoelectro-Mechanics Association, published Apr. 30, 1991). In the same figure, the numeral 21 denotes a light emitting element, numeral 22 denotes a light receiving element disposed in an opposed relation to the light emitting element 21, and numeral 23 denotes a rotary slit disk fixed to a rotatable shaft in a position between the light emitting element 21 and the light receiving element 22. Numeral 24 denotes a fixed slit plate disposed between the light emitting element 21 and the light receiving element 22 together with the rotary slit disk 23. Numeral 25 denotes an amplifier for amplifying a signal obtained by the reception and conversion of light in the light receiving element 22 after passing through the rotary slit disk 23 and the fixed slit disk 24.

The operation of such conventional optical rotary encoder will now be described. In the rotary slit disk 23 are formed n number of concentric tracks constituted by slits corresponding to binary code bits which represent absolute angle addresses. Generally, the number of tracks, n, corresponds to the binary code length, n and it is determined by an angular resolution of the encoder used. In the illustrated example, n is set at 4. The fixed slit plate 24 is disposed on an optical path connecting the light emitting element 21 and the light receiving element 22. A rotational angle of the rotatable shaft is coded to the presence or absence of transmitted light from the rotary slit disk 23 and the fixed slit plate 24. This code is converted to an electric signal by the light receiving element 22, which signal is then amplified by the amplifier 25 and outputted.

According to the construction of the conventional position detector, as referred to above, the electrodes 5a and 5b are disposed at both ends of the flat plate-like photodiode 1. Therefore, in the case of forming the photodiode annularly for detecting an incident position of the light spot having an annular path, it is necessary to dispose two output electrodes 5a and 5b in any positions on the annular photodiode 1. In this construction, when the light spot is radiated to both electrodes 5a and 5b or to the gap between both electrodes, there arises a problem such that an output in the position detection is indefinite.

Since the conventional optical rotary encoder has the foregoing construction, in order to clearly detect the amount of light transmitted through openings of both rotary slit disk 23 and the fixed slit plate 24, it is necessary to dispose the disk 23 and the plate 24 in close proximity to each other. Particularly in the case of a high resolution encoder, the diffusion of light is marked because of a narrower slit width, so that a change in the spacing between the rotary slit disk 23 and the fixed slit plate 24 causes a great change in detection characteristics. Therefore, it is necessary to strictly control the spacing. There has also been a problem in that an eccentric condition caused by an error accidentally generated on fabricating the rotary slit disk 23 or an error accidentally generated on mounting the disk 23 to the rotatable shaft directly leads to an angle detection error.

SUMMARY OF THE INVENTION

The present invention has been accomplished for eliminating the above-mentioned problems, and in connection with detecting the-position of a light spot which describes an annular path, it is an object of the present invention to provide an improved position detector capable of detecting an incident position of such light spot on the circumference with a high accuracy and without any indefinite area.

It is another object of the present invention to provide an effective position detecting method using such improved position detector.

It is a further object of the present invention to provide an optical rotary encoder not requiring the use of a fixed slit plate and capable of eliminating the influence of eccentricity.

In the position detector according to the present invention, a resistor is disposed concentrically along the outer periphery of a flat plate-like photodiode formed in an annular shape, a plurality of output electrodes are attached to the resistor, and electrically conductive layers like fine wires are projected from the resistor onto the photodiode radially at equal angular intervals so as to subdivide the angular spacing between adjacent output terminals.

In this position detector, a photocurrent generated upon incidence of a light spot is divided by the resistor disposed as a concentric circle on the outer periphery of the annular photodiode and the thus-divided currents are taken out through a pair of predetermined output electrodes, whereby the position of a light spot which moves while describing an annular path can be detected without forming any indefinite area.

In a position detecting method according to the present invention, the number of output electrodes in the position detector is set to a multiple of 4, then a pair of opposed output electrodes and a pair of output electrodes opposed thereto at an angle of 90° are selected, then current values generated in the output electrodes upon incidence of a light spot are measured, then a difference between the measured current values in the output electrodes of each pair is divided by the sum thereof, and on the basis of the two division results obtained there is detected an incident position of the light spot.

Thus, according to this position detecting method, among the output electrodes arranged 4n pieces (n is an integer) at equal angular intervals, a pair of opposed output electrodes and a pair of output electrodes opposed thereto at an angle of 90° are selected and a difference between measured current values in the output terminals of each pair is divided by the sum thereof to thereby uniquely specify the position of the light spot incident on the position detector.

According to a position detecting method in another aspect of the present invention, the number of output electrodes in the foregoing position detector is set at a multiple of 4 not less than 8, the position detected by the above position detecting method is regarded as an approximate position, then a pair of output electrodes located on both sides of an output electrode closest to the approximate position are selected, then a difference between current values generated in the selected output electrodes upon incidence of a light spot is divided by the sum thereof, and on the basis of the division results obtained there is detected an incident position of the light spot.

Thus, in this position detecting method, the number of output electrodes is set at 4m (m is an integer of 2 or more), then a pair of output electrodes located on both sides of an output electrode closest to the position detected by the previous position detecting method are selected and a difference between measured current values in the selected output electrodes is divided by the sum thereof, whereby an incident position of the light spot can be detected with a higher accuracy.

An optical rotary encoder according to the present invention includes the foregoing position detector having an annular photodiode; a rotary member for deflecting light emitted from a light source and moving a spot of the light on the photodiode of the position detector correspondingly to a rotational angle of the rotary member; and a position detecting means for detecting an incident position of the light spot on the position detector in accordance with any of the foregoing position detecting methods.

Thus, in this optical rotary encoder, the rotary member deflects the light from the light source and moves a spot of the light on an annular path correspondingly to a rotational angle of the rotary member, the light spot being formed on the annular photodiode of the position detector, then an incident position of the light spot is detected by any of the foregoing methods, whereby the use of a fixed slit plate is not needed and there is no influence of eccentricity.

According to an optical rotary encoder in another aspect of the present invention, a rotary disk pattern is used wherein the interior of each of n areas obtained by division using dividing lines spaced at equal angular intervals with respect to the rotating shaft of the disk is constituted by a linear diffraction grating formed at a predetermined certain angle relative to a bisector of the dividing line, a diffracted light obtained upon radiation of a monochromatic light to the linear diffraction grating is converged to a light spot of a specific size, and a rotational angle of the rotary disk is determined from the position of the light spot.

Thus, in this optical rotary encoder, a rotational angle of the rotary disk is detected on the basis of the direction of light diffracted by a linear diffraction grating in the pattern formed on the rotary disk, thereby eliminating the necessity of using an index scale and reducing an angle detection error caused by eccentricity.

According to an optical rotary encoder in a further aspect of the present invention, the linear diffraction grating in each area is made parallel to a bisector of the dividing line and is converged in the direction perpendicular to the direction of the bisector, and the rotary disk is irradiated with a light beam so as to form a linear monochromatic light spot in the direction of the bisector on the disk.

Thus, in this optical rotary encoder, a light spot on the rotary disk is formed as a linear spot converged in the circumferential direction, whereby the divided area of the linear diffraction grating can be made small to increase the number of divided areas, n, in the pattern.

According to an optical rotary encoder in a still further aspect of the present invention, a linear diffraction grating is irradiated with at least two monochromatic light spots which are angularly shifted by about $(2m+1)\pi/n$ radian (m is an integer) with respect to the rotating shaft of the rotary disk, then the diffracted light beams are each converged to a light spot of a specific size, and a rotational angle of the rotary disk is determined from the positions of the light spots.

In this optical rotary encoder, when one light spot on the rotary disk lies on an area dividing line of the linear diffraction grating, the other light spot is radiated nearly centrally of the area of the linear diffraction grating, whereby it is made possible to eliminate a detection infeasible area based on the presence of a boundary.

According to an optical rotary encoder in a still further aspect of the present invention, a diffracted light from a linear diffraction grating is reflected and is again directed to the same linear diffraction grating, then the light beam again diffracted by that diffraction grating is changed direction and separated, then converged to a light spot of a specific size, from whose position there is obtained a rotational angle of the rotary disk.

Thus, in this optical rotary encoder, a spot of light which has been diffracted twice is used in the detection of angle, whereby the movement of the light spot on the position detector relative to a rotational angle is doubled to improve the detection sensitivity.

According to an optical rotary encoder in a still further aspect of the present invention, a pattern on the rotary disk is formed by a slit whose opening width in the radial direction changes linearly in response to a rotational angle of the rotary disk, and a rotational angle of the disk is determined from the intensity of transmitted light obtained when light is radiated to a part of the slit.

Thus, in this optical rotary encoder, since light is radiated directly to the rotary disk and the intensity of transmitted light is detected, it is no longer necessary to use an index scale.

According to an optical rotary encoder in a still further aspect of the present invention, as patterns on the rotary disk there are provided two kinds of patterns one of which uses the foregoing linear diffraction pattern and the other uses slits, and a rotational angle of the rotary disk is determined from the position of light spot and intensity of transmitted light detected by them.

In this optical rotary encoder, a pattern of linear diffraction gratings constituted by n number of areas is used as a precise detection pattern, while a pattern formed in such a manner that the transmitted light quantity of illumination light changes linearly relative to a rotational angle of the rotary disk is used as a rough detection pattern, thereby further improving the resolution in absolute angle detection.

According to an optical rotary encoder in a still further aspect of the present invention, a diffraction grating wherein the diffracted light quantity of illuminated light changes linearly in accordance with a rotational angle of the diffraction grating is used as a pattern on the rotary disk, and a rotational angle of the rotary disk is determined from the intensity of light diffracted upon radiation of light to a part of the pattern.

In this optical rotary encoder, since light is radiated directly to the rotary disk and its diffracted light intensity is detected, it is not necessary to use an index scale.

According to an optical rotary encoder in a still further aspect of the present invention, as patterns on the rotary disk there are provided two kinds of patterns one of which uses the foregoing linear diffraction pattern and the other uses a change in the amount of diffracted light, and a rotational angle of the rotary disk is determined from the position of light spot and intensity of diffracted light detected by them.

In this optical rotary encoder, by using diffraction patterns as the two kinds of patterns on the rotary disk, it is made possible to form all the patterns simultaneously at the time of formation of rotary disk patterns, whereby the manufacturing process for such patterns is simplified.

According to an optical rotary encoder in a still further aspect of the present invention, as patterns on the rotary disk, there are provided a first pattern using linear diffraction grating and a second pattern using slits, the first pattern is irradiated with at least two monochromatic light spots shifted angularly by about $(2m+1)\pi/n$ radian relative to the rotating shaft of the rotary disk, then respective diffracted light beams are converged to light spots of a specific size and the positions of those light spots are detected, while light is radiated to a part of the second pattern and the intensity of transmitted light is detected, then a rotational angle of the rotary disk is determined from the position of the light spot selected on the basis of the transmitted light intensity.

In this optical rotary encoder, which portion of the linear diffraction grating in the first pattern is illuminated by the illuminating light spot is specified on the basis of an output obtained from the second pattern which is formed so that the transmitted light quantity of illumination light changes linearly in accordance with a rotational angle of the rotary disk, whereby a rotational angle of the rotary disk is always detected using a light spot which is radiated nearly centrally of the area of the linear diffraction grating out of plural light spots being radiated to the linear diffraction grating, thereby permitting the detection of an absolute angle free of a detection infeasible area caused by the presence of a boundary.

According to an optical rotary encoder in a still further aspect of the present invention, a diffraction grating which exhibits a linear charge in accordance with a rotational angle of the rotary disk is used as the above second pattern, and one light spot diffracted in the first pattern is selected on the basis of the intensity of diffracted light obtained upon radiation of light to a part of the second pattern, then a rotational angle of the rotary disk is determined from the position of the selected light spot.

In this optical rotary encoder, since a diffraction pattern which exhibits a linear change in the diffracted light quantity of illumination light in accordance with a rotational angle of the rotary disk is used as the second pattern for selecting a light spot in the first pattern, it is possible to simplify the rotary disk manufacturing process.

According to an optical rotary encoder in a still further aspect of the present invention, there are formed on the rotary disk a track which outputs a saw-tooth wave once for each rotation of the rotary disk and two tracks which output saw-tooth waves m times for each rotation of the rotary disk, the saw-tooth waves each having a phase difference of half cycle, and a rotational angle of the rotary disk is determined from the outputs of those tracks.

Thus, in this optical rotary encoder, since a rotational angle of the rotary disk is detected using waveforms different in phase, it is possible to effect the detection of an absolute angle free of a detection infeasible area.

According to an optical rotary encoder in a still further aspect of the present invention, as patterns on the rotary disk, there are provided two kinds of patterns—a first pattern using the foregoing linear diffraction grating and a second pattern which deflects light in a predetermined certain direction and forms a light spot moving along an annular path in accordance with a rotational angle of the rotary disk -, and a rotational angle of the rotary disk is determined from light spot positions detected by them.

In this optical rotary encoder, since all the patterns on the rotary disk are diffraction gratings, they can be formed simultaneously at the time of pattern formation on the disk, thus simplifying the pattern forming process.

According to an optical rotary encoder in a still further aspect of the present invention, the foregoing position detector is used as a position detector of a second position detecting means.

Thus, in this optical rotary encoder, since the improved position detector is used as a position detector of a second position detecting means, it is possible to specify a light spot position without forming any indefinite area in rough detection.

BRIEF DESCRIPTION OF THE DRAWINGS

FIG. 6 is a block diagram showing a second embodiment of the present invention;

FIG. 8 is a block diagram showing a third embodiment of the present invention;

FIGS. 12(a) and 12(b) are explanatory views showing a structure of a rotary disk;

FIG. 15 is a construction diagram showing a seventh embodiment of the present invention;

FIG. 17 is a construction diagram showing an eighth embodiment of the present invention;

FIG. 27 is an explanatory view showing track outputs relative to rotation of a rotary disk in the thirteenth embodiment;

DETAILED DESCRIPTION OF THE PREFERRED EMBODIMENTS

Embodiment 1

Figure 1:
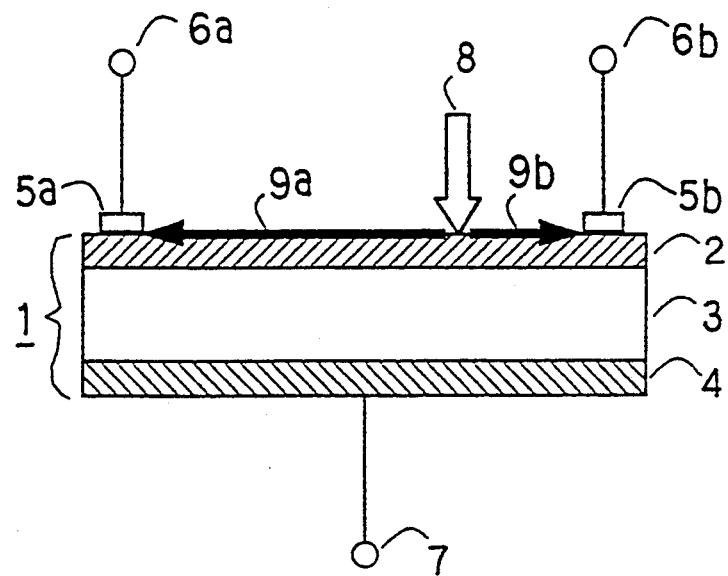
FIG. 1 is a sectional view showing a conventional position detector.
Figure 2:
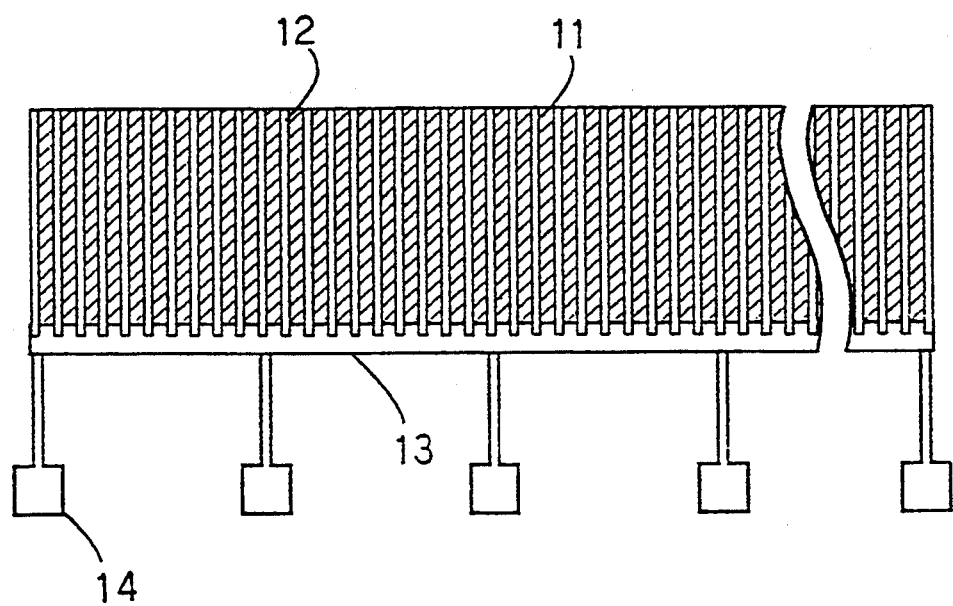
FIG. 2 is a plan view showing another conventional position detector.
Figure 3:
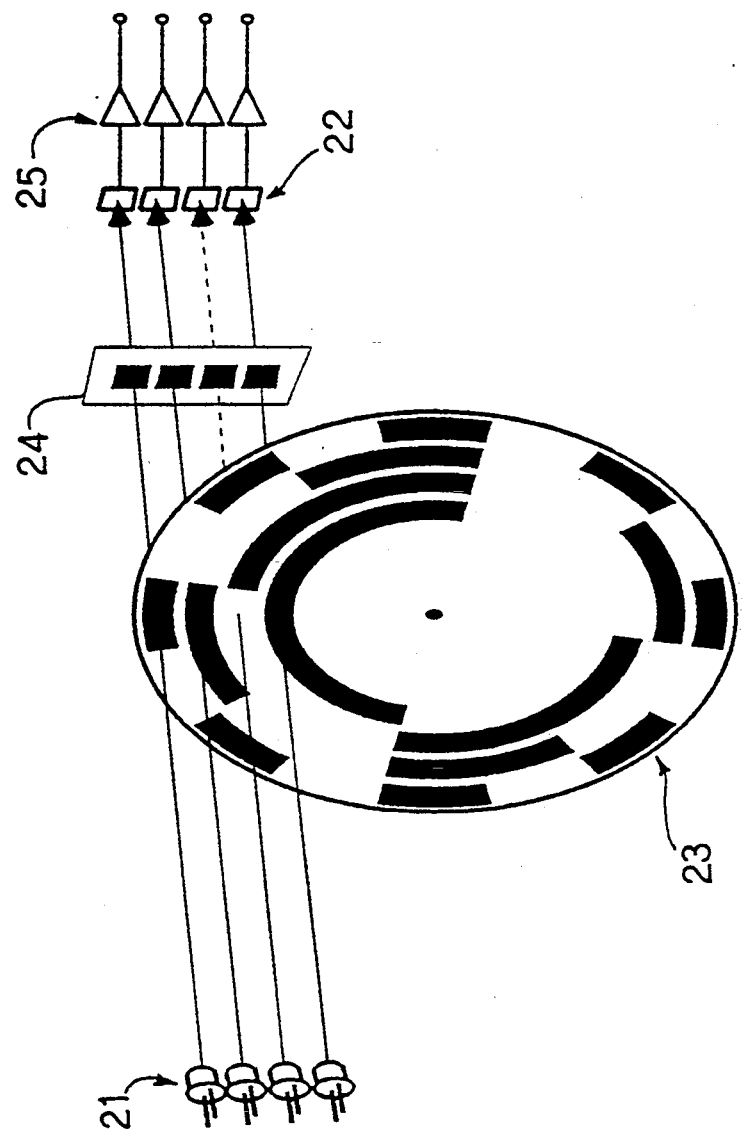
FIG. 3 is a construction diagram showing a conventional optical rotary encoder.
Figure 4:
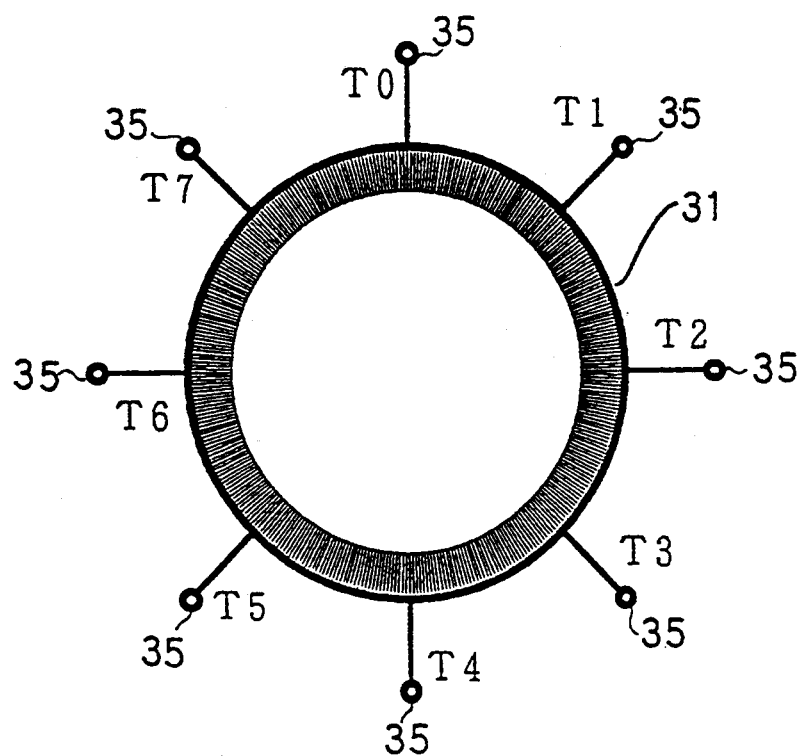
FIG. 4 is a plan view showing a first embodiment of the present invention.
Figure 5:
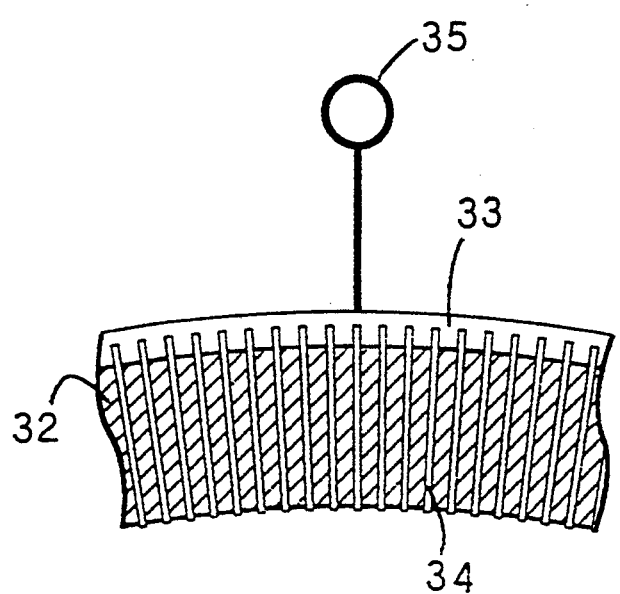
FIG. 5 is an enlarged plan view showing a principal portion of the first embodiment on a larger scale.

The first embodiment of the present invention will now be described with reference to the drawings. FIG. 4 is a plan view showing a position detector 31, and FIG. 5 is an enlarged plan view showing a portion of the position detector on a larger scale. In these figures, the reference numeral 32 denotes a flat plate-like photodiode, which is formed in the shape of a ring and in this point different from the photodiode indicated at 11 in FIG. 2. Numeral 33 denotes a resistor disposed along the outer periphery of the annular photodiode 32 concentrically with the photodiode 32. Numeral 34 denotes an electrically conductive layer provided in a plural number, the conductive layers 34 projecting from the resistor 33 onto the photodiode 32 up to the inner peripheral portion of the photodiode radially at equal angular intervals. Numeral 35 denotes an output electrode provided in a plural number, the output electrodes 35 being attached to the resistor 33 at equal angular intervals. In this embodiment, eight output electrodes 35 are arranged at intervals of 45° and are numbered from T0 to T7. The number of the electrically conductive layers 34 is larger than that of the output electrodes 35 to subdivide the angular spacing between adjacent output electrodes 35.

The operation of this embodiment will now be described. Upon incidence of a light spot on the annular photodiode 32, an optically excited electric charge proportional to the incident light energy is generated in the incident position. If any one output electrode 35 is reverse-biased with respect to the substrate, the generated electric charge is taken out as an electric current from the output electrode 35. If the resistance value of the annular resistor 33 is sufficiently smaller than the surface resistance of the photodiode 32, the electric current will flow into the resistor 33 through the electrically conductive layers 34 and pass through this resistor into the reverse-biased output electrode 35. When two output electrodes are selected and each reverse-biased to permit extraction of an electric current, there exists the following equation if the resistivity in the circumferential direction of the resistor 33 is ρ, the distances from the light spot incidence position up to the two output electrodes 35 are X and Y, and electric currents taken out from those electrodes are Ix and Iy:

$$\rho X \times Ix = \rho Y \times Iy \tag{2}$$

Therefore, the following equation is established and the position of the light spot between the selected output electrodes 35 can be determined from the electric current values Ix and Iy:

$$(Ix-Iy)/(Ix+Iy)=(Y-X)/(X+Y) \tag{3}$$

Since the positions of the selected output electrodes 35 are already known, it becomes possible to specify the light spot position on the position detector 31.

Thus, according to the construction of this embodiment, the annular resistor 33 for the detection of position is disposed concentrically along the outer periphery of the annular photodiode 32 serving as a light receiving surface and the output electrodes 35 are projected at equal intervals from the resistor 33, so it is no longer necessary to dispose electrodes on the light receiving surface and hence there is no longer any dead zone caused by the presence of electrode. Further, the resistor 33 for the detection of position becomes free of discontinuity, whereby the specifying of a light spot incidence position on the circumference can be made more reliable.

Embodiment 2

The second embodiment of the present invention will now be described with reference to drawings. FIG. 6 is a block diagram showing a construction for practising a position detecting method according to the present invention. In the same figure, the numeral 42 denotes a selector for selecting designated output electrodes 35 out of those used in a position detector 31 and conducting them to a measuring/computing unit which will be described hereinafter. Numeral 44 denotes an operation controller which controls the selector 42 and specifies the position of light spot incident on the position detector 31 in accordance with the result of operation outputted from the measuring/computing unit 43.

Figure 7:
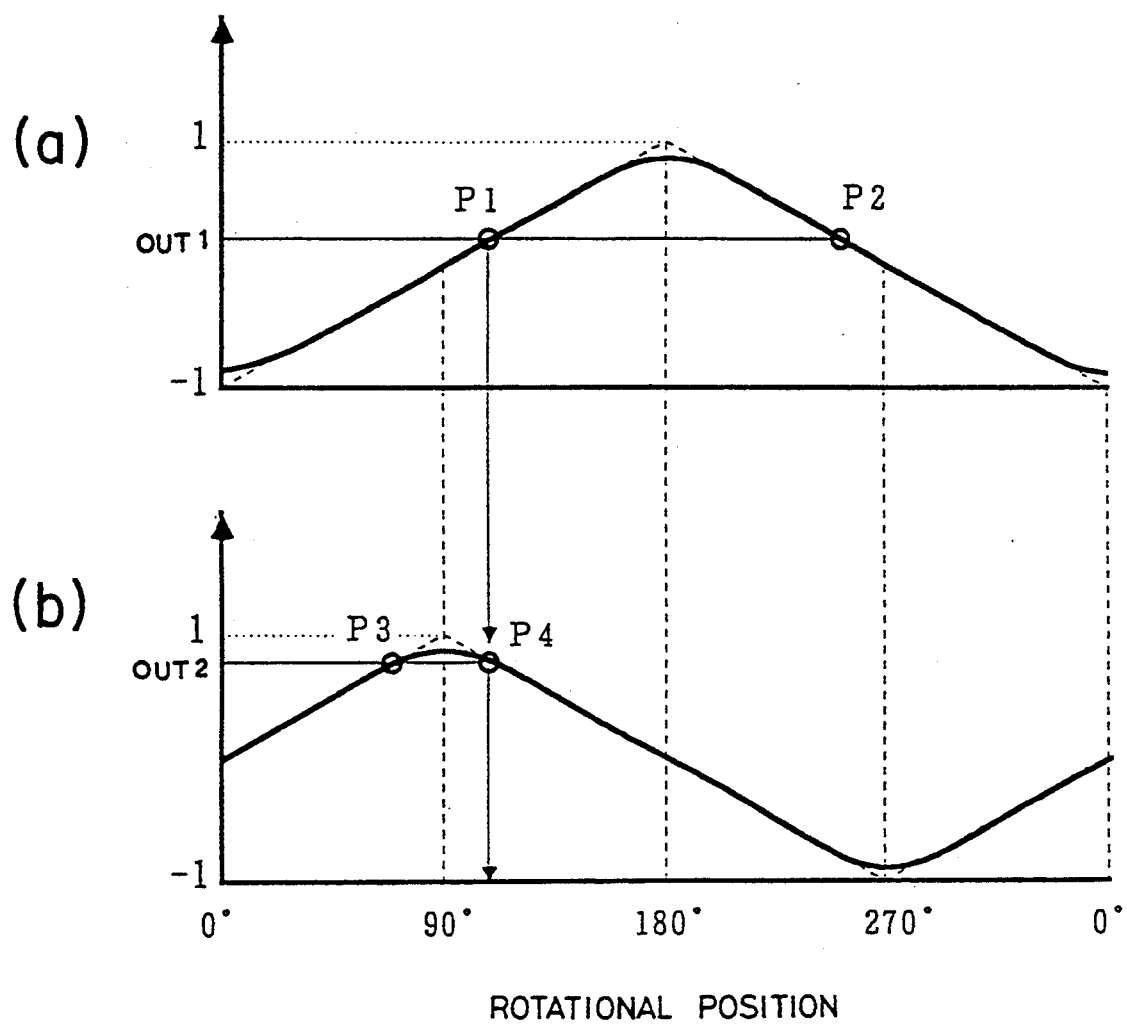
FIG. 7 is a waveform diagram for explaining the operation of the second embodiment.

The operation of this second embodiment will now be described. FIG. 7 is a waveform diagram showing output from the measuring/computing unit 43 relative to an angular position of light spot on the circumference of the position detector 31. For detecting a light spot position, first the operation controller 44 selects a pair of output electrodes 35 located in opposed positions on the circumference of the position detector 31, e.g. T0 and T4 in FIG. 4, and drives the selector 42, whereby the outputs from the paired output electrodes 35 (T0 and T4) are conducted to the measuring/computing unit 43, which in turn measures current values outputted from the paired output electrodes 35 and divides a difference between the two by the sum thereof. For example, if the current value outputted from T0 is I0 and that from T4 is I4, an output OUT1 is calculated by the following equation and fed to the operation controller 44:

$$OUT1=(I4-I0)/(I4+I0) \tag{4}$$

Next, a pair of output electrodes 35 which are opposed to each other at an angle of 90° relative to the paired output electrodes 35, e.g. T2 and T6, are selected, and in the same manner as above, if a current value outputted from T2 is I2 and that from T6 is I6, an output OUT2 is calculated by the following equation in the measuring/computing unit 43 and then fed to the operation controller 44:

$$OUT2=(I2-I6)/(I2+I6) \tag{5}$$

The relation between incident positions of light spot on the circumference of the position detector 31 and the output OUT1 and the relation between such incident positions and the output OUT2 each present a triangular wave shape with the output electrode position as the apex. There is a phase difference of 90° between the outputs OUT1 and OUT2. With one output, e.g. OUT1, two light spot positions which are detected, rotational positions P1 and P2, are conceivable and thus it is impossible to specify a light spot position. But when the output OUT2 is added and there are obtained detected rotational positions P3 and P4, the detected rotational position P1 or P4, which are in alignment with each other, is a true incident position of the light spot, and thus the position on the circumference of the position detector 31 is determined uniquely.

In the case where a light spot is present near the apex of each triangular wave, that is, near an output electrode 35, there is obtained a triangular wave which is somewhat dull with respect to an ideal triangular wave. As a position detection output, therefore, it is better to use a detection output closer to the center between adjacent output electrodes 35 in order to effect the detection with a higher accuracy.

Thus, in this embodiment, the position of light spot on the circumference of the position detector 31 is determined uniquely from current values outputted from two pairs of perpendicularly intersecting output electrodes 35 as described previously. At this time, a detecting resolution is determined by both the SN ratio of electric currents in the electrode spacing of a semicircle and the resolution of the measuring/computing unit 43. The resolution, γ, of the position detector is generally determined by the following equation:

$$\gamma = L \times (4kTB/R + 2qBI)^{\frac{1}{2}} \tag{6}$$

where,
L: spacing of output electrodes 35
k: Boltzmann's constant
T: absolute temperature
B: band width
R: resistance between output electrodes 35
q: unit electric charge
I: electric current Since the resistance R between output electrodes is proportional to the spacing L between output electrodes 35, the smaller the spacing L, the higher the resolution. On the other hand, it is not desirable to set high the resolution of the measuring/computing unit 43 because it will cause an increase in the cost of the processing circuit. It is the third embodiment that has been effected taking the above point into consideration, which embodiment will be described below.

Embodiment 3

FIG. 8 is a block diagram showing a construction for practising a position detecting method according to the third embodiment. In the same figure, the numeral 45 denotes an operation controller, in which a position detected by a processing similar to that of the operation controller 44 shown in FIG. 6 is set as a rough position. The operation controller 45 again instructs a selector 42 to select a pair of output electrodes 35 located on both sides of an output electrode 35 closest to the rough position. At this time, the operation controller 45 specifies a precise incident position of light spot on the basis of an operation result outputted from a measuring/computing unit 43. In this embodiment, it is necessary that a position detector 31 be provided with 4m pieces (m is an integer of 2 or more) of output electrodes 35, and there are used eight (m=2) such output electrodes 35 as shown in FIG. 4.

Figure 9:
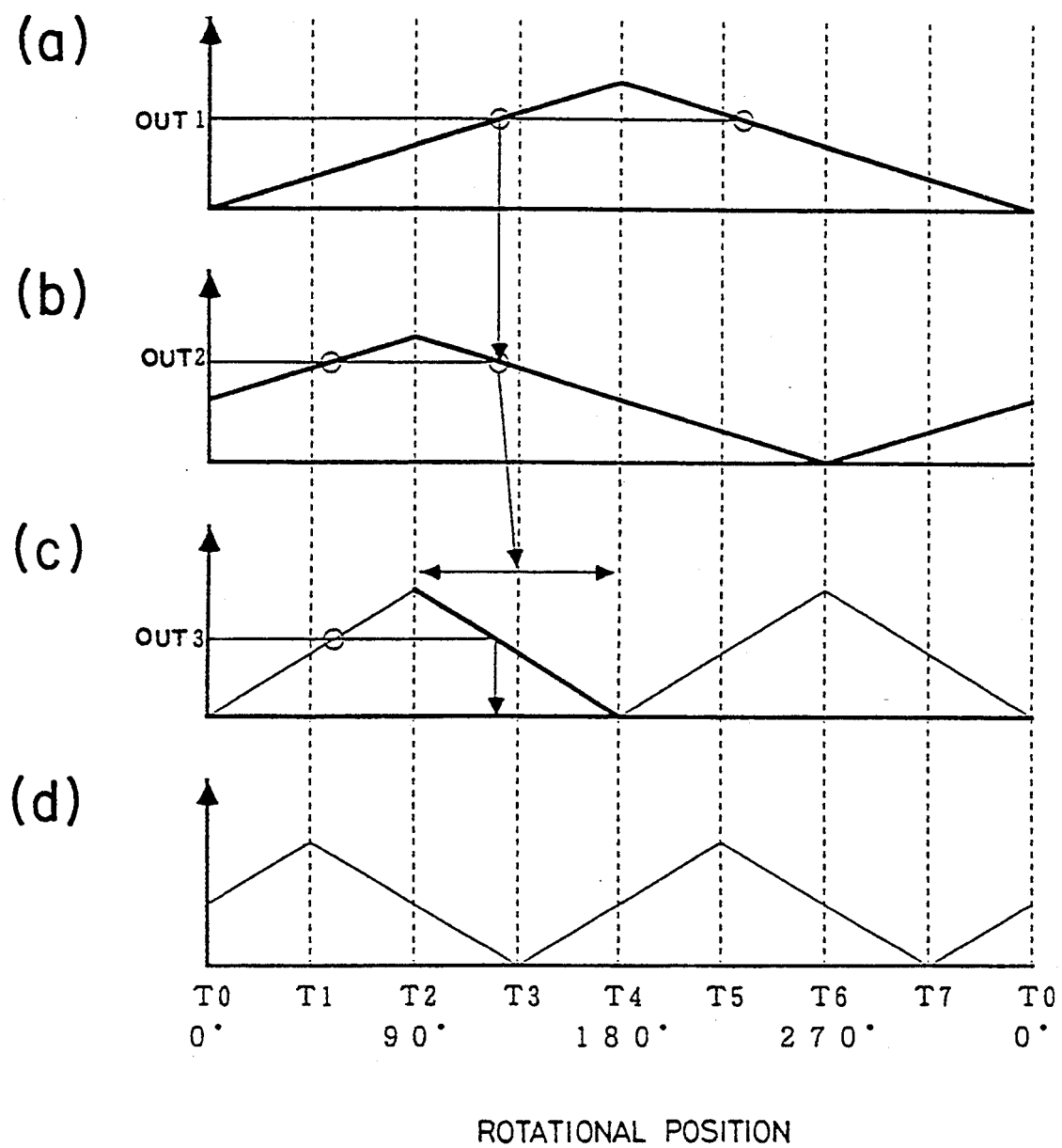
FIG. 9 is a waveform diagram for explaining the operation of the third embodiment.

The operation of this embodiment will now be described. FIG. 9 is a waveform diagram showing outputs from the measuring/computing unit 43 with respect to angular positions of light spot on the circumference of the position detector 31. In the illustrated embodiment m is set at 2, and along the axis of abscissa there are plotted rotational positions and corresponding Nos. T0 to T7 of the output electrodes 35. First, as in the second embodiment, the operation controller 45 instructs the selector 42 to select two pairs of perpendicularly intersecting output electrodes 35 and then uniquely determines a rough position in the circumference of the position detector 31 on the basis of outputs OUT1 and OUT2 provided as operation results from the measuring/computing unit 43.

Next, the operation controller 45 selects a pair of output electrodes 35 located on both sides of an output electrode 35 closest to the rough position thus determined and identifies them to the selector 42. Electric currents from the paired output electrodes 35 are conducted to the measuring/computing unit 43, which in turn transmits an operation result to the operation controller 45. This operation result is an output OUT3. FIG. 9 shows an example of having selected the output electrodes 35 of T2 and T4 on the basis of the outputs OUT1 and OUT2. Since the gradient of the output OUT3 is m times as large as the outputs OUT1 and OUT2, a light spot position between the output electrodes of T2 and T4 can be detected with a resolution which is m times higher. Further, since the position of each output electrode 35 is of a known value, it is possible to specify a light spot position on the circumference of the position detector 31.

Moreover, by selecting four output electrodes 35 simultaneously in the selector 42, then conducting a pair of them to the measuring/computing unit 43 as output electrodes corresponding to the foregoing outputs OUT1 and OUT2, while assuming the other pair of output electrodes to be present on the semicircle side opposite to the semicircle used in the detection and assuming them to be electrodes adjacent to the electrodes used in the detection, then by shorting them to a bias voltage equal to the voltage of the paired electrodes used in the detection, the SN ratio improved because an equivalently shortened interelectrode spacing results and hence it is possible to further improve the resolution.

Embodiment 4

The position detector described in the first embodiment and the position detecting method explained in the second or third embodiment are applicable to an optical rotary encoder for detecting a rotational angle of a rotating machine. Such an optical rotary encoder will be described below.

Figure 10:
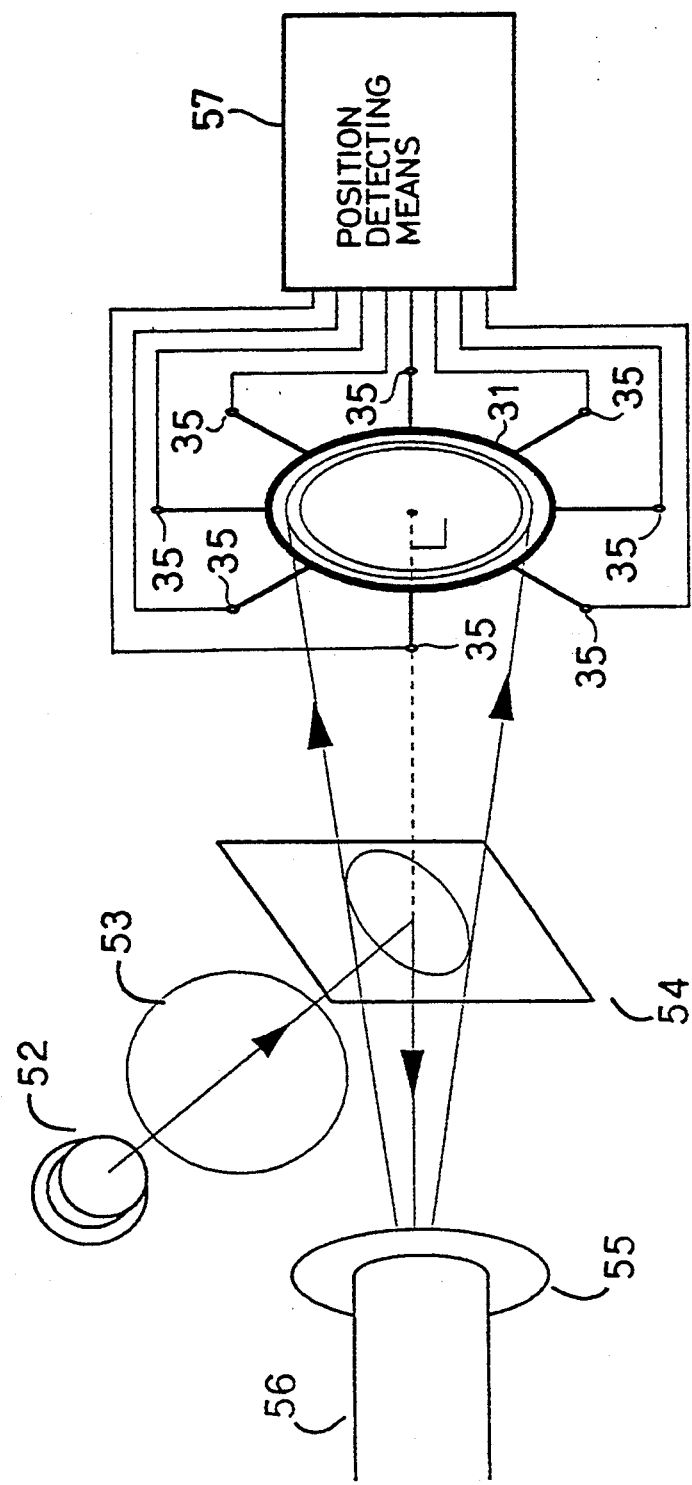
FIG. 10 is a construction diagram showing a fourth embodiment of the present invention.

FIG. 10 is a construction diagram showing an optical rotary encoder according to a fourth embodiment of the present invention. In the same figure, the numeral 52 denotes a light source for emitting a light beam; numeral 53 denotes a condenser lens for converging the light beam emitted from the light source 52; numeral 54 denotes a half mirror for changing an optical path of the converged light beam; numeral 55 denotes a deflector as a rotary member which deflects the converged light reflected by the half mirror 54; and numeral 56 denotes a rotating shaft for rotating the deflector 55. Further, the numeral 31 denotes the position detector used in the first embodiment, and numeral 57 denotes a position detecting means for detecting a light spot incidence position from output current values provided from output electrodes 35.

The operation of this embodiment will now be described. The light beam emitted from the light source 52 is converged by the condenser lens 53 and enters the half mirror 54, which reflects the light beam. The thus-reflected light beam enters the deflector 55. In the deflector 55, the beam is reflected while being deflected in a certain direction with respect to the deflector. The light beam then enters the half mirror 54 again. Transmitted light from the half mirror 54 enters the position detector 31 and forms a light spot on the annular photodiode 32 of the position detector. The deflector 55 is mounted on the rotating shaft 56 and rotates with rotation of the same shaft, so that the traveling path of the reflected light forms a cone in which an angle twice the deflection angle of the deflector 55 is a vertical angle. The position detector 31 is disposed perpendicularly to the rotational axis of the reflected light, namely the optical axis of the reflected light in the case of the deflection angle being 0°, and with the center of the annular photodiode 32 made-coincident with the optical axis. A suitable distance between the deflector 55 and the photodiode 32 is set so that the light spot is radiated onto the photodiode 32. And a suitable condenser lens 53 is selected so that the converged light is a focus of the light spot on the photodiode 43. Thus, the position of the light spot formed on the annular photodiode is in corresponding relation to the rotational angle of the rotating shaft 56. This light spot position is detected using the position detecting means 57 and in accordance with the position detecting method of the foregoing second or third embodiment and is outputted as a rotational angle.

If a deflector not having the incident position dependency such as a diffraction grating for example is used as the deflector 55, there will be no change in the position of light spot on the position detector 31 even when the position of light beam incident on the deflector 55 changes under the influence of eccentricity or the like, and thus it is possible to realize an optical rotary encoder not influenced by eccentricity.

Embodiment 5

Figure 11:
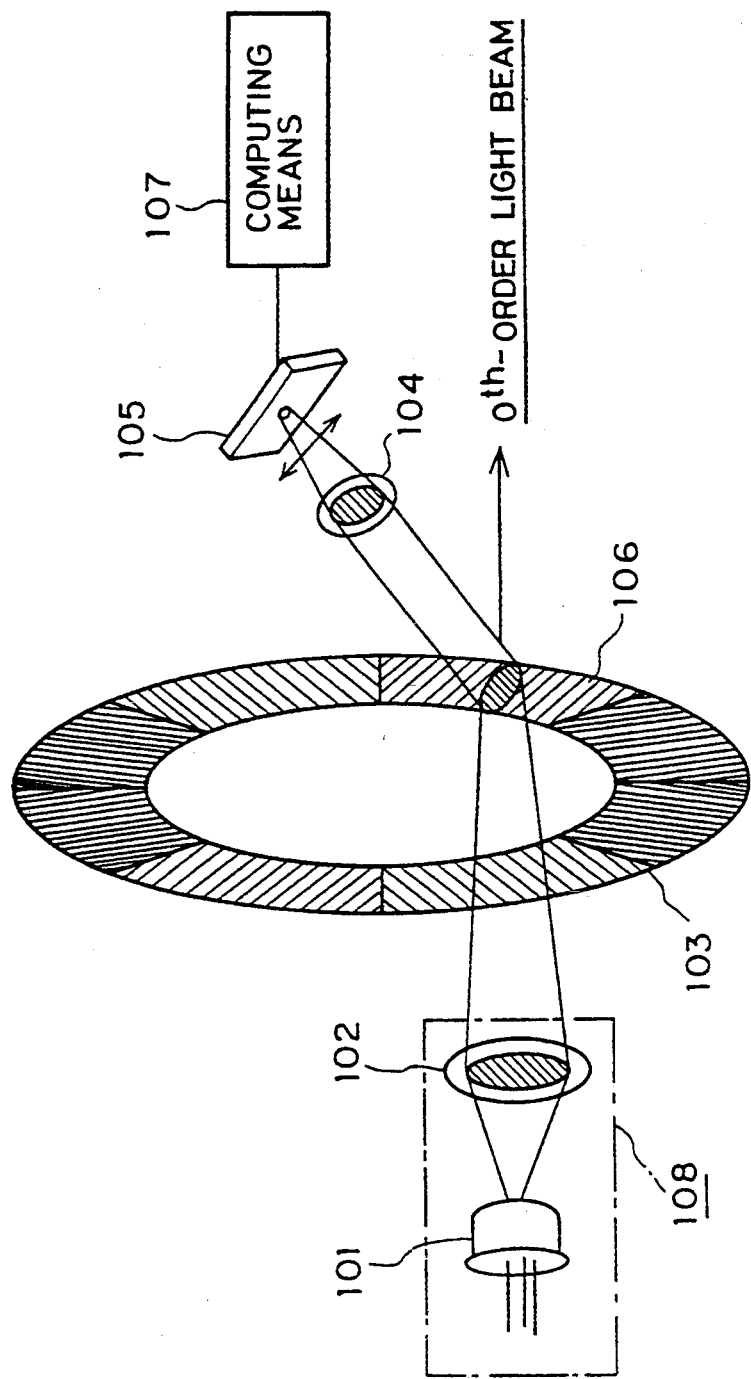
FIG. 11 is a construction diagram showing a fifth embodiment of the present invention.

The fifth embodiment of the present invention will now be described with reference to drawings. FIG. 11 is a construction diagram showing an optical rotary encoder according to the fifth embodiment. In the same figure, the numeral 101 denotes a monochromatic light source, e.g. laser diode. Numerals 102 and 104 each denote a condenser lens, and numeral 103 denotes a rotary disk disposed between the condenser lenses 102 and 104. Numeral 105 denotes a position detector as a position detecting means for detecting the position of a light spot formed by the condenser lens 104. For example, the position detector 105 comprises a semiconductor. Numeral 107 denotes a computing means for calculating and outputting a rotational angle of the rotary disk 103 on the basis of the light spot position detected by the position detecting means. Numeral 108 denotes a lighting means which comprises the monochromatic light source 101 and the condenser lens 102.

FIG. 12 is an explanatory view showing the structure of the rotary disk 103 in detail. In the same figure, the numeral 106 denotes an area (hereinafter referred to as "grating sector") formed by dividing the circumference into equal n parts. In the grating sector 106 there is formed a linear diffraction grating having a pitch P. The angle between dividing lines 202a and 202b for the grating sector 106 is $2\pi/n$ radian. Further, the linear diffraction grating in any area is formed so as to be at a predetermined certain angle relative to a bisector 203 for the dividing lines 202a and 202b. Therefore, the pattern formed on the rotary disk 103 is of a periodic structure in which the same shape is repeated at every rotation of $2\pi/n$ radian.

Figure 13:
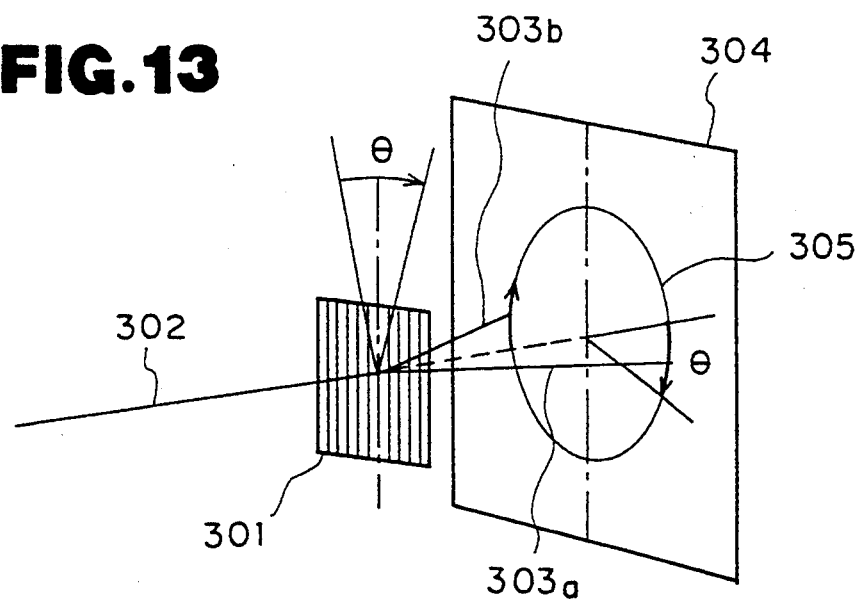
FIG. 13 is an explanatory view showing a state of diffracted light relative to rotation of a linear diffraction grating.

FIG. 13 is an explanatory view showing a state of diffracted light relative to rotation of a linear diffraction grating. In the same figure, the numeral 301 denotes a linear diffraction grating formed in each grating sector 106, and numeral 302 denotes a parallel light beam. Numerals 303a and 303b each denote a diffracted light generated upon incidence of the parallel light beam 302 on the linear diffraction grating 301. Numeral 304 denotes an observation surface for observing the diffracted lights 303a and 303b, and numeral 305 denotes a circumference which represents a path of spots of the diffracted lights 303a and 303b moving on the observation surface 304.

The operation of the optical rotary encoder according to this fifth embodiment will now be described with reference to FIGS. 11 and 13. Upon incidence of the parallel light beam 302 on the linear diffraction grating 301, there are generated diffracted lights 303a and 303b in a plane perpendicular to the grating by the diffracting action of the linear diffraction grating 301. As the linear diffraction grating 301 rotates, the diffracted lights 303a and 303b also rotate, so that diffracted light spots on the observation surface 304 move on the circumference 305. A rotational angle of each spot on the observation surface 304 relative to a rotational angle $\theta$ of the linear diffraction grating 301 is also $\theta$, and if the radius of the circumference 305 is r, a linear movement distance L of each spot in the rotation of $\theta$ is represented by the following equation:

$$L = 2r \sin(\theta/2) \quad (7)$$

If the rotational angle $\theta$ is sufficiently small, the above equation (7) is approximated as follows and it becomes possible to detect the angle directly from the moving distance:

$$L = r\theta \quad (8)$$

In FIG. 11, the light beam emitted from the monochromatic light source 101 enters one grating sector 106 on the rotary disk after being condensed into a beam of a size received within the grating sector 106 by means of the condenser lens 102. The light diffracted by the linear diffraction grating in the grating sector 106 enters the position detector 105 after converged into a spot shape appropriate for the position detector 105 by the condenser lens 104. If the wavelength of the incident light is $\lambda$ and the diffraction grating pitch is P, a diffraction angle $\phi$ of a primary diffracted light can be expressed as follows:

$$\phi = \sin^{-1}(\lambda/P) \quad (9)$$

The position detector 105 is mounted so that its position detecting direction is coincident with the direction of movement of the light spot on the position detector induced by rotation of the rotary disk. If the focal length of the condenser lens 104 is f, the moving distance L of the light spot corresponding to the rotational angle $\theta$ of the linear diffraction grating is as follows:

$$L = 2f \tan\phi \sin(\theta/2) \quad (10)$$

In this case, if the rotational angle $\theta$ is sufficiently small, the equation (10) is approximated as follows and thus the moving distance is proportional to the rotational angle:

$$L = f\theta \tan\theta \quad (11)$$

A position detecting range of the position detector 105 is set so as to include a light spot moving range of $2\pi f \tan\phi /n$ based on a grating rotation corresponding to the rotational angle $2\pi/n$ of one grating sector 106.

When the rotary disk 103 rotates within one round, since the pattern thereon is of a periodic structure wherein the same shape is repeated at every rotation of $2\pi/n$ radian, the light spot also repeats its movement n times on the position detector 105. Therefore, by counting position detection signals, it is made possible to constitute an incremental encoder wherein the resolution of the position detector 105 is an angular resolution. Further, since a position detection signal in the grating sector 106 represents an absolute angle in the range of that grating sector, an absolute value encoder of a single rotation can be constituted by providing a discriminating means for the grating sector 106.

In the event of occurrence of eccentricity due to deflection of the rotating shaft of the rotary disk 103 in the angle detecting system using such linear diffraction grating, the influence thereof appears as parallel shift in the same plane of the rotary disk and does not cause a change in the rotational angle of the diffraction grating. Therefore, if the parallel shift caused by eccentricity is within the grating sector 106, an angle detection output is not influenced at all by such eccentricity.

Embodiment 6

Figure 14:
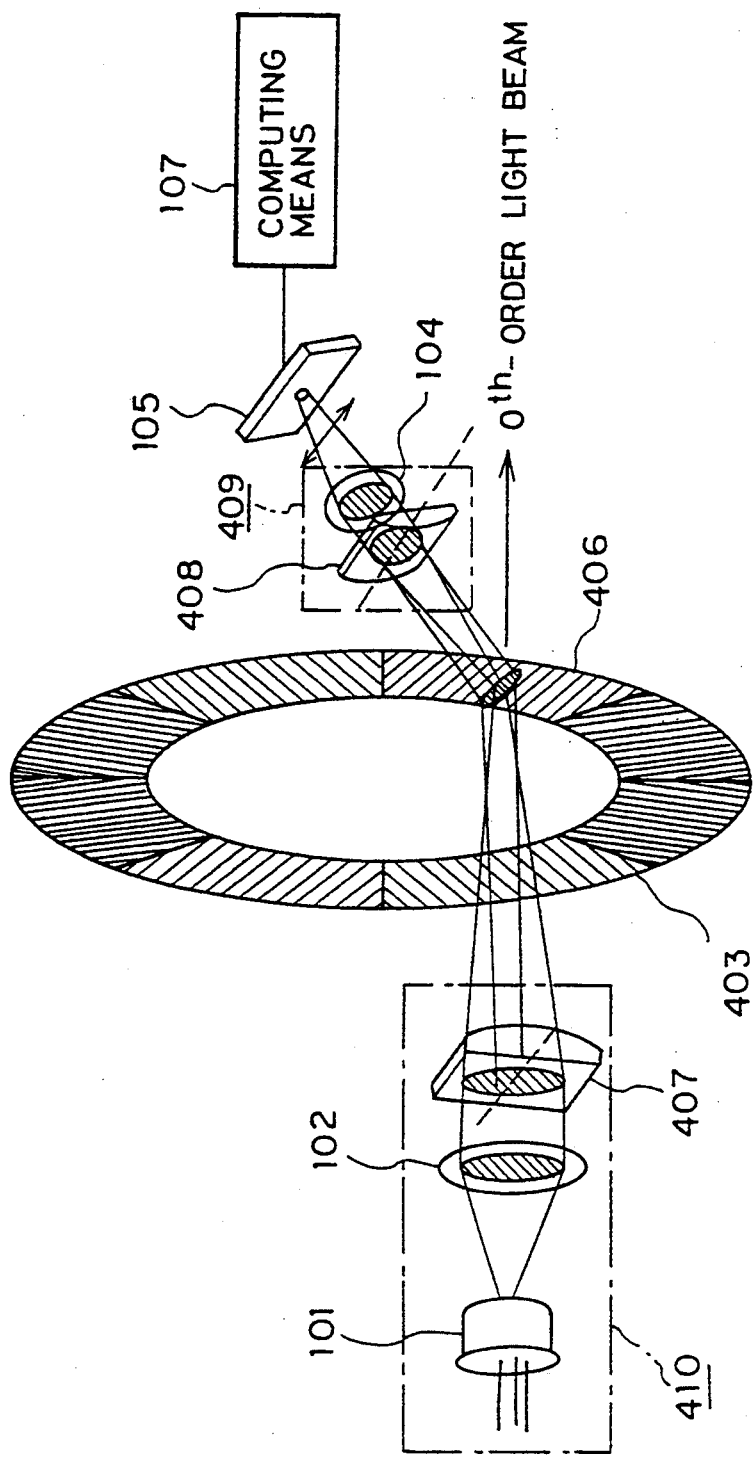
FIG. 14 is a construction diagram showing a sixth embodiment of the present invention.

The sixth embodiment of the present invention will now be described with reference to a drawing. FIG. 14 is a construction diagram showing an optical rotary encoder according to the sixth embodiment, in which the same portions as in FIGS. 11 and 12 are indicated by the same reference numerals as in those figures to omit explanation. In FIG. 14, the numeral 403 denotes a rotary disk, having a structure which is almost the same as the structure of the rotary disk 103 used in the fifth embodiment. Numeral 406 denotes a grating sector, in which the grating direction of a linear diffraction grating is in parallel with the bisector 203 in the grating sector, and in this point the grating sector 406 is different from the grating sector 106 used in the fifth embodiment. Numerals 407 and 408 represent cylindrical lenses, which are arranged in such a manner that they condense light in the radial direction of the rotary disk 403 and the focus is taken on the rotary disk. Numeral 409 denotes a light converging means constituted by both the condenser lens 104 and the cylindrical lens 408. Numeral 410 denotes a lighting means constituted by a monochromatic light source 101, a condenser lens 102 and the cylindrical lens 407.

Description is now directed to the operation of this embodiment. The light beam emitted from the monochromatic light source 101 is converged by the condenser lens 102 and the cylindrical lens 407 to form a linear spot in the grating sector 406. This linear spot is set so that the light condensing direction is the radial direction of the rotary disk 403 as mentioned above and the length thereof is within the radial width of the grating sector 406. The light diffracted by the linear diffraction grating in the grating sector 406 is converged into a spot shape appropriate for the position detector 105 by means of the condenser lens 104 and the cylindrical lens 408, which spot is incident on the position detector 105. In the lighting means 410, either the condenser lens 104 or the cylindrical lens 408 may be omitted if only it is possible to form a spot shape appropriate for the position detector 105.

In such construction, since the linear spot is focused on the position detector 105, an angular variation of the diffracted light with respect to the linear spot converged direction does not influence the spot on the position detector. Further, since the linear diffraction grating is formed so that the grating direction is parallel to the bisector in the sector 406, a change in the diffracted light direction caused by rotation is perpendicular to the converged direction of the linear spot. Thus, without any influence on the rotational angle detecting ability, it is possible to detect a light spot position on the position detector 105 and effect the detection of angle as in the fifth embodiment.

Embodiment 7

The seventh embodiment of the present invention will now be described with reference to drawings. FIG. 15 is a construction diagram showing an optical rotary encoder according to the seventh embodiment, in which the same portions as those already explained are indicated by the same reference numerals as the previous ones to omit explanation. A basic construction of this embodiment 7 is the same as that of the sixth embodiment. A grating beam splitter 508 is inserted between the monochromatic light source 101 and the rotary disk 403, though in FIG. 15 it is disposed between the condenser lens 102 and the cylindrical lens 407 as an example, and two position detectors 509a and 509b are disposed in parallel with each other. Numeral 509 denotes a position detecting means constituted by the two position detectors 509a and 509b. Numeral 510 denotes a lighting means which comprises the monochromatic light source 101, condenser lens 102, cylindrical lens 407 and the grating beam splitter 508 just referred to above.

Description is now directed to the operation of this seventh embodiment. Like the sixth embodiment, a linear spot is formed on the rotary disk 403 by means of the monochromatic light source 101, condenser lens 102 and cylindrical lens 407. In this case, the light beam is branched at least in two directions by the grating beam splitter 508 disposed in an intermediate position, so that at least two linear spots are formed on the rotary disk 403. A branch angle of the grating beam splitter 508 is set so that the spacing between at least two linear spots is $(2m+1)/2$ (m is an integer) times the width in the circumferential direction of the grating sector 406, or $(2\pi m + 1)/n$ radian in terms of a rotational angle of the rotary disk. The two position detectors 509a and 509b are disposed so as to detect the positions of two spots formed through the cylindrical lens 408 and the condenser lens 104 from diffracted light beams of the two linear spots on the rotary disk 403 which diffracted light beams are obtained by the linear diffraction grating.

Figure 16:
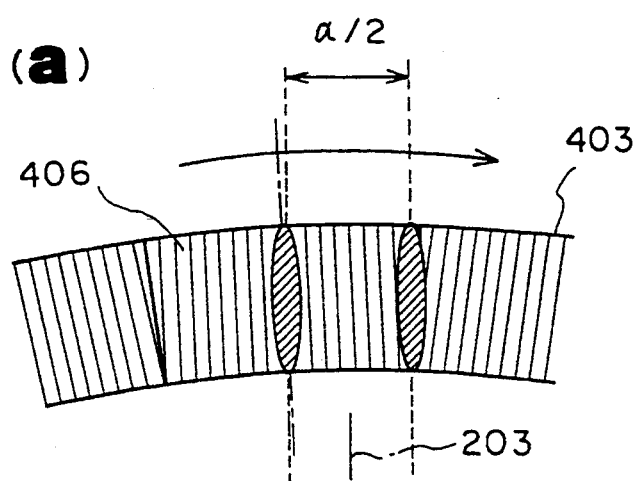
FIGS. 16(a)–16(c) is an explanatory view showing a state of two linear spots converged on a rotary disk in the seventh embodiment.
Figure 16:
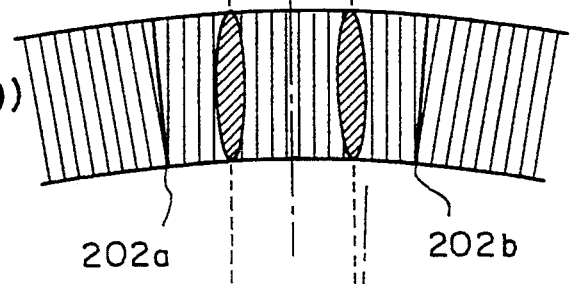
Figure 16:
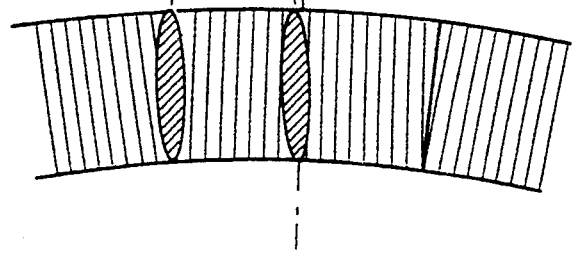

FIG. 16 is an explanatory view showing positions irradiated with the two linear spots on the rotary disk 403 in the case of m=0. The rotary disk 403 rotates like (a), (b) and (c) in the same figure, from which it is seen that when one spot lies at a boundary of the grating sector 406, the other spot is sure to illuminate the central part of the grating sector 406, and thus one of the two spots is sure to be present in the grating sector 406. Therefore, a computing means 107 used herein is constructed in such a manner that when one of the linear spots lies at a boundary of the grating sector 406 and the detecting ability of one position detector, e.g. 509a, is insufficient due to disturbance of the spot shape, a rotational angle is calculated using a detection output of the other position detector 509b. Thus, there is not formed a detection unfeasible area based on such boundary of the grating sector 406.

Embodiment 8

The eighth embodiment of the present invention will now be described with reference to drawings. FIG. 17 is a construction diagram showing an optical rotary encoder according to the eighth embodiment, in which the same portions as in the previous description are indicated by the same reference numerals as above to omit explanation. In the same figure, the numeral 710 denotes a separating means for separation between illuminating light beam and reflected light beam. The separating means 710 is disposed between the monochromatic light source 101 and the rotary disk 103. Numeral 711 denotes a reflecting means for reflecting a light beam which has passed through a transmission type linear diffraction grating-on the rotary disk 103 and allowing the reflected light beam to enter of the same linear diffraction grating again. As the separating means there can be used, for example, a half mirror or a polarization beam splitter. In the case of using a half mirror, a reflecting mirror is used as the reflecting means 711 located behind the rotary disk 103, while..in the case of using a polarization beam splitter, it is necessary to use a λ/4 plate and a reflecting mirror in combination as the reflecting means 711. In the construction of this eighth embodiment, the reflecting means 711 is disposed in parallel with the rotary disk 103 and in this case light is reflected to the same optical path, so it is necessary that the angle of incidence on the rotary disk 103 from the monochromatic light source 101 be set at the angle of diffraction of the linear diffraction grating. Conversely, in the case of a perpendicular incidence of light, the diffracted and transmitted light is inclined, so it is necessary that the reflecting means 711 be tilted with respect to the rotary disk 103.

Figure 18:
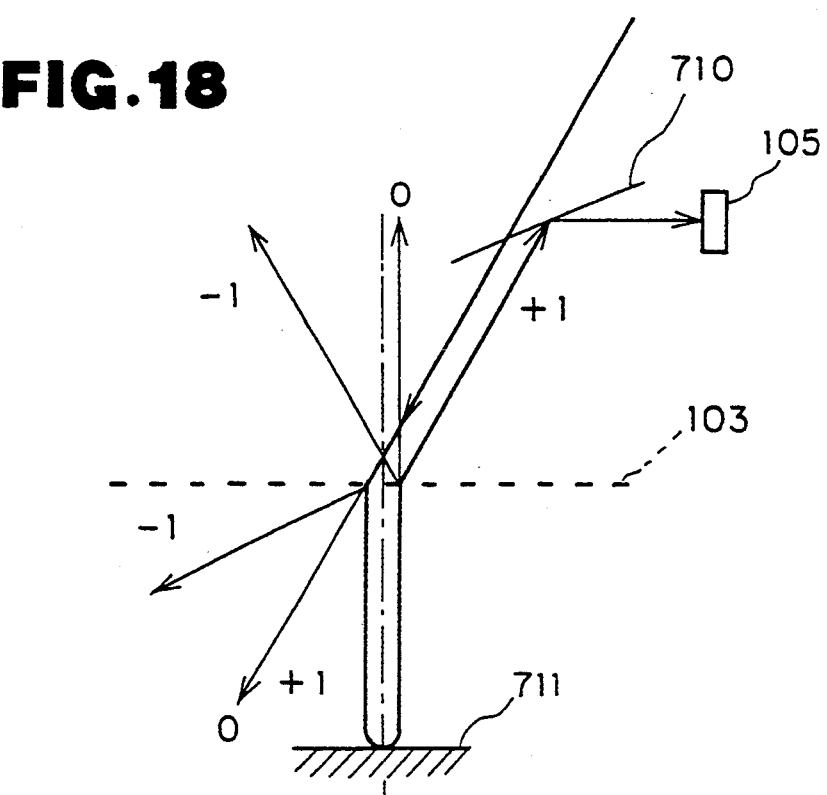
FIG. 18 is an explanatory view showing a state of diffracted light in a linear diffraction grating and a reflecting mirror both used in the eighth embodiment.
Figure 19:
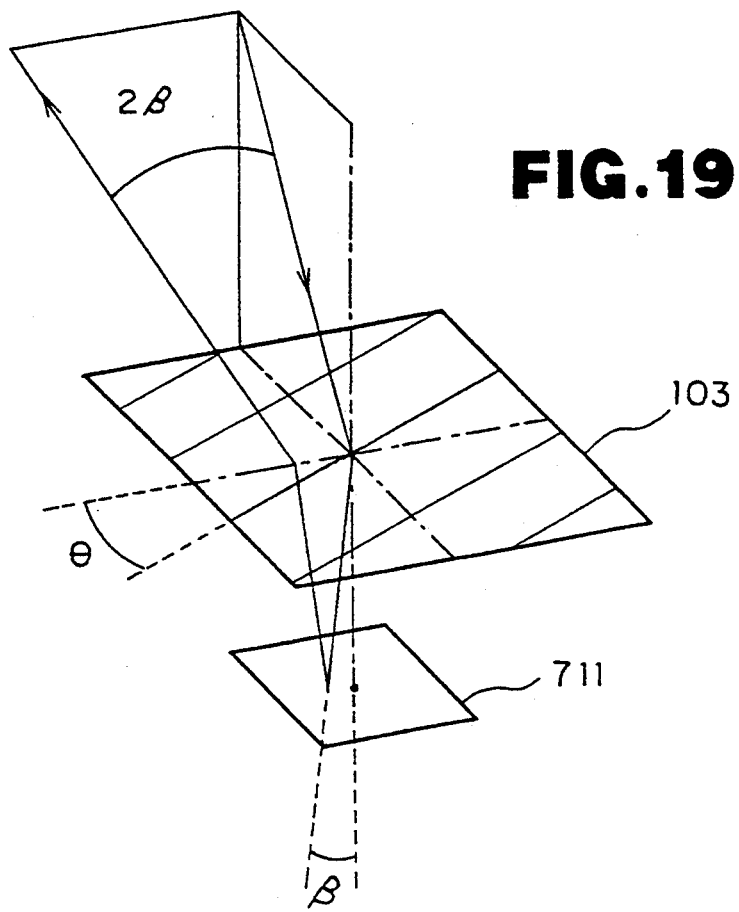
FIG. 19 is an explanatory view showing a state of diffracted light relative to rotation of a linear diffraction grating in the eighth embodiment.

The operation of this embodiment will now be described. FIG. 18 is an explanatory view showing a state of diffracted light in both the linear diffraction grating and the reflecting mirror in this embodiment, and FIG. 19 is an explanatory view showing a state of diffracted light relative to rotation of the linear diffraction grating. The light beam emitted from the monochromatic light source 101 is condensed into a size received within each grating sector 106 by means of the condenser lens 102 and then enters one grating sector 106 on the rotary disk 103. As noted previously, the reflecting means 711 is disposed in parallel with the rotary disk 103, so in order for both incidence and reflection to follow the same optical path, a perpendicular exit of the diffracted and transmitted light (+1 order diffracted light in the figure) is necessary as shown in FIG. 18. Therefore, the angle of incidence of the incident light is set so as to be the same angle as the +1 order diffracted light of the reflected light. FIG. 19 shows how the diffracted light changes with rotation of the rotary disk 103. As shown therein, as the rotary disk 103 rotates by an angle of $\theta$, the linear diffraction grating also rotates by the same angle, so that the diffracted and transmitted light deviates from the perpendicularity by an angle of $\beta$. This angle $\beta$ corresponds to a change in the diffracting direction of diffracted light when the diffraction grating rotates by the angle $\theta$ as already explained in connection with FIG. 13, etc.; that is, it corresponds to a movement of the light spot on the position detector 105. Next, the reflected light again enters the rotary disk 103, where it undergoes the second diffraction, then returns to the lighting means 108 side. At this time it further undergoes an angular change of $\beta$, so the reflected light travels toward the position detecting means 105 while involving an angular change of a total of $2\beta$. Thus, there can be obtained an angular resolution which is twice as high as the angular resolution in a single diffraction.

Embodiment 9

Figure 20:
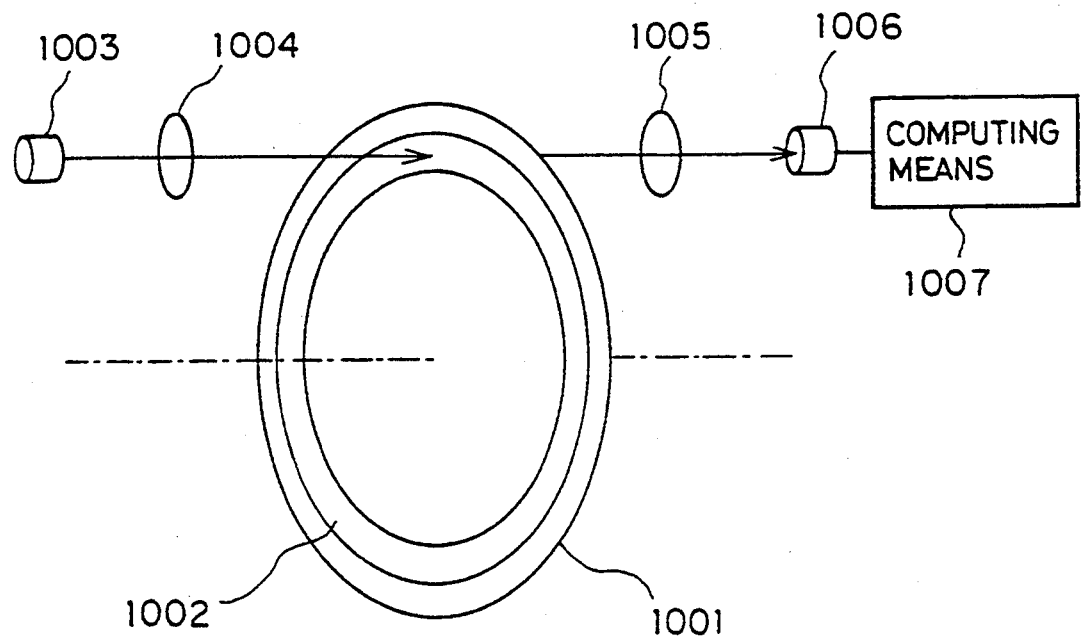
FIG. 20 is a construction diagram showing a ninth embodiment of the present invention.

The ninth embodiment of the present invention will now be described with reference to drawings. FIG. 20 is a construction diagram showing an optical rotary encoder according to the ninth embodiment. In the same figure, the numeral 1001 denotes a rotary disk; numeral 1002 denotes a track formed on the rotary disk 1001; numeral 1003 denotes a light source as a lighting means for radiating light to a part of the rotary disk 1001; numerals 1004 and 1005 each denote a condenser lens; and numeral 1006 denotes a light intensity detector for detecting the intensity of light which has passed through the rotary disk 1001, the light intensity detector 1006 being a photodiode for example. Numeral 1007 denotes a computing means for calculating and outputting a rotational angle of the rotary disk 1001 from the transmitted light intensity detected by the light intensity detector 1006.

Figure 21:
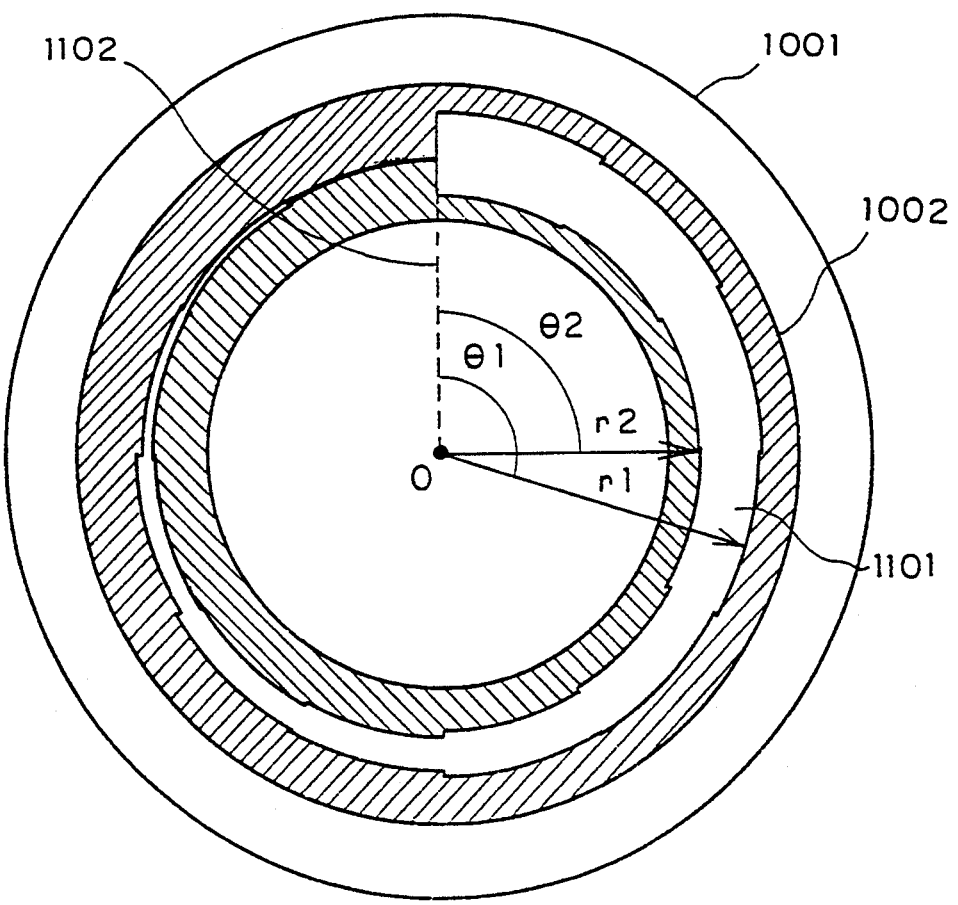
FIG. 21 is a plan view showing a track pattern formed on a rotary disk in the ninth embodiment.

FIG. 21 is a plan view of a pattern of the track 1002 formed on the rotary disk 1001. In the same figure, the numeral 1101 denotes a light transmitting slit, and the other portion in the track is opaque. If the distances from the center indicated at 0 up to the outer and inner peripheries of the opening of the slit 1101 are r1 and r2, respectively, their angles from a broken line 1102 in FIG. 21 are $\theta 1$ and $\theta 2$, respectively, and when $\theta 2=0$, r2 is r0, while when $\theta 1=\theta 2=0$, r1−r2 is rG, then the opening of the slit 1101 has a shape which satisfies the following equations:

$$r1 = r0 + rG - ((1-a) \times rG)/2\pi \times \theta 1 \quad (12)$$

$$r2 = r0 + (a \times rG)/2\pi \times \theta 2 \quad (13)$$

$$0 \leq a \leq 1$$

The operation of this embodiment will now be described. The light beam emitted from the light source 1003 enters the track 1002 through the condenser lens 1004. In this case, the incident light beam is not received within the opening of the slit 1101 of the track 1002 in the radial direction of the rotary disk 1001. Light which has passed through the slit 1101 is converged onto the light intensity detector 1006 by the condenser lens 1005 and the intensity of the transmitted light is detected by the detector 1006. When the rotary disk 1001 rotates, the intensity of transmitted light detected by the light intensity detector 1006 is linear relative to the rotational angle of the rotary disk and represents an absolute angle of one rotation of the rotary disk. Thus, by detecting the intensity of transmitted light through the slit 1101, it is made possible to constitute an absolute value encoder of one rotation.

Embodiment 10

Figure 22:
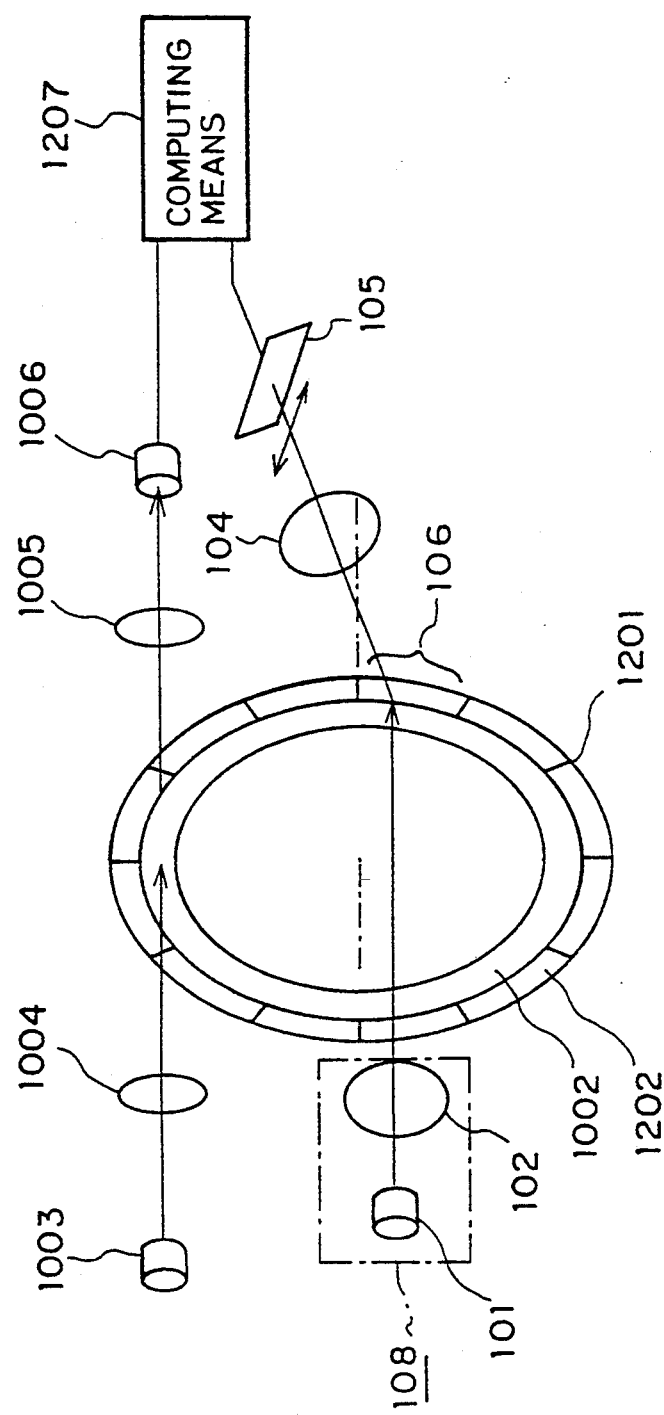
FIG. 22 is a construction diagram showing a tenth embodiment of the present invention.

The tenth embodiment of the present invention will now be described with reference to a drawing. FIG. 22 is a construction diagram showing an optical rotary encoder according to the tenth embodiment, in which the portions already explained above are indicated by the same reference numerals as above to omit explanation. In the same figure, the numeral 1201 denotes a rotary disk and numeral 1202 denotes a track having a first pattern formed by n number of grating sectors 106 whose interiors are each constituted by a linear diffraction grating. The track 1202 is disposed so as not to interfere with a track 1002 which has a second pattern formed by slit 1101. Numeral 1207 denotes a computing means for calculating and outputting a rotational angle of the rotary disk 1201 on the basis of the output of the position detecting means 105 and that of the light intensity detector 1006.

Description is now directed to the operation of this tenth embodiment. The light beam emitted from the monochromatic light source 101 is condensed into a size received within each grating sector 106 by means of the condenser lens 102 and then enters one grating sector 106 on the track 1202 of the rotary disk 1201. The light diffracted by the linear diffraction grating in the grating sector 106 is converged into a spot shape appropriate for the position detector 105 by the condenser lens 104 and then enters the position detector 105. As in the fifth embodiment, the position detection signal represents an absolute angle in the range of the grating sector 106.

On the other hand, the light beam emitted from the light source 1003 enters the track 1002 on the rotary disk 1201 through the condenser lens 1004. In this case, adjustment is made so that the incident light beam is not received within the opening of the slit 1101 of the track 1002 in the radial direction of the rotary disk 1201. The transmitted light from the slit 1101 is condensed on the light intensity detector 1006 by the condenser lens 1005, and its intensity is detected. When the rotary disk 1201 rotates, the light intensity detected by the light intensity detector 1006 represents an absolute angle of one rotation of the rotary disk as in the ninth embodiment.

Discrimination of each grating sector 106 in the track 1202 can be done by detecting an absolute angle of one rotation of the rotary disk 1201 in an angular resolution of not higher than $2\pi/n$ radian. Therefore, by detecting an absolute angle of one rotation of the rotary disk 1201 in an angular resolution of not higher than $2\pi/n$ radian using the light intensity detector 1006 and thereby discriminating a grating sector 106, it is made possible to constitute an absolute value encoder of one rotation using the resolution of the position detector 105 as an angular resolution.

Embodiment 11

Figure 23:
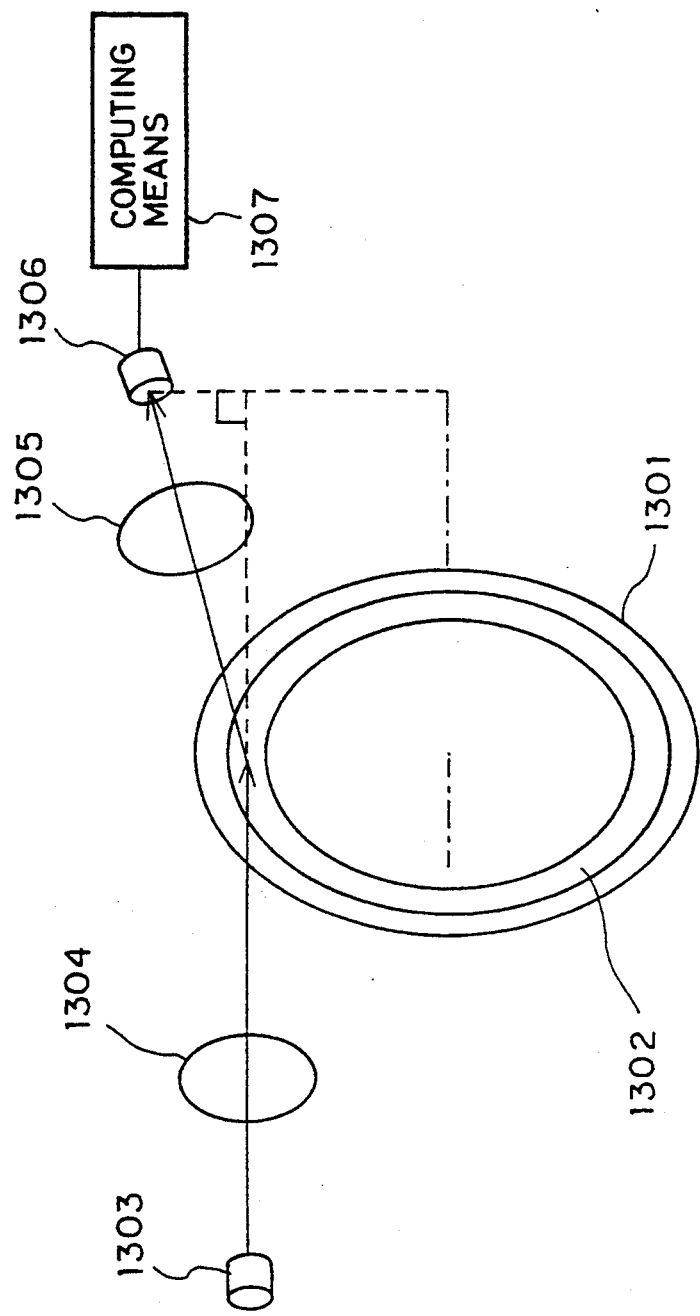
FIG. 23 is a construction diagram showing an eleventh embodiment of the present invention.

The eleventh embodiment of the present invention will now be described with reference to drawings. FIG. 23 is a construction diagram showing an optical rotary encoder according to the eleventh embodiment. In the same figure, the numeral 1301 denotes a rotary disk; numeral 1302 denotes a track formed on the rotary disk 1301; numeral 1303 denotes a monochromatic light-source as a lighting means for radiating a monochromatic light to a part of the rotary disk 1301; numerals 1304 and 1305 each denote a condenser lens; and numeral 1306 denotes a light intensity detector. Numeral 1307 denotes a computing means for calculating a rotational angle of the rotary disk 1301 from the intensity of diffracted light detected by the light intensity detector 1306.

Figure 24:
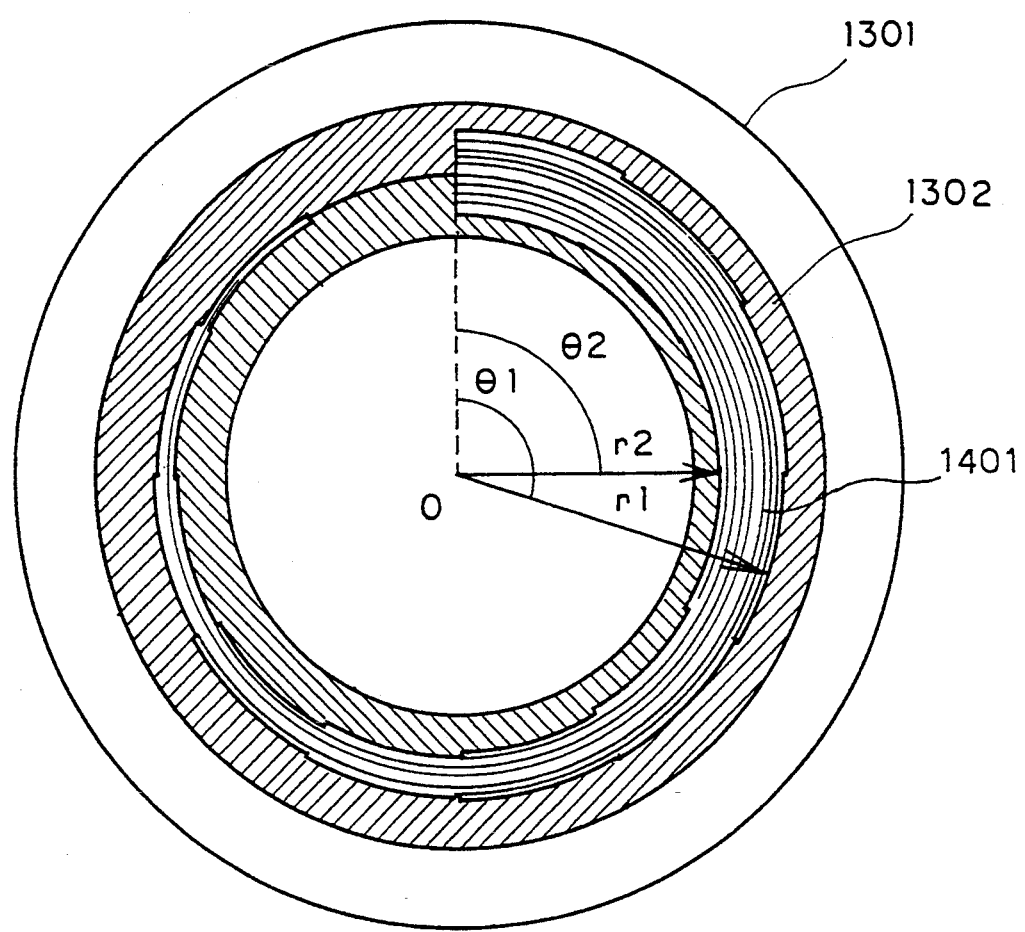
FIG. 24 is a plan view showing a track pattern formed on a rotary disk in the eleventh embodiment.

FIG. 24 is a plan view showing a pattern of the track 1302 formed on the rotary disk 1301. In the same figure, the numeral 1401 denotes a transmission type diffraction grating, which is, for example, a phase modulation type diffraction grating of an uneven pattern. It is optional whether the other portion than the diffraction grating 1401 of the rotary disk 1301 is transparent or opaque. The shape of the diffraction grating 1401 is the same as that of the slit 1101 in the embodiment 9, and the diffraction grating 1401 has an arcuate grating concentric with the rotary disk 1301.

Reference will now be made to the operation of this embodiment. The light beam emitted from the light source 1303 enters the track 1302 through the condenser lens 1304. In this case, adjustment is made so that the incident light beam is not received within the diffraction grating 1401 of the track 1302 in the radial direction of the rotary disk 1301. The first order diffracted light obtained through the diffraction grating 1401 is condensed on the light intensity detector 1306 by the condenser lens 1305, and its intensity is detected by the detector 1306. When the rotary disk 1301 rotates, the diffracted light intensity detected by the light intensity detector 1306 is linear relative to the rotational angle of the rotary disk 1301 and represents an absolute angle of one rotation of the rotary disk. Therefore, by detecting the intensity of the diffracted light obtained through the diffraction grating 1401, it is made possible to constitute an absolute value encoder of one rotation.

Embodiment 12

Figure 25:
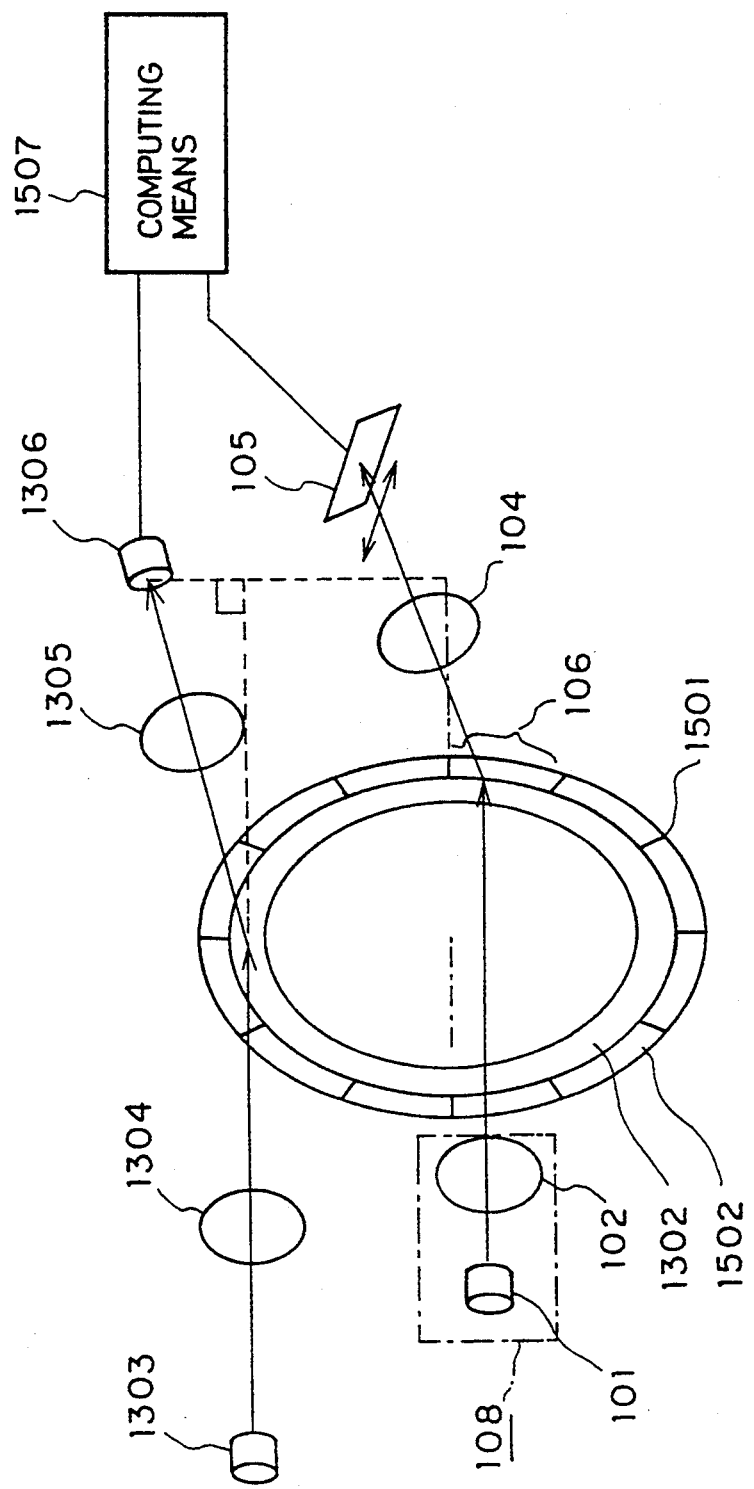
FIG. 25 is a construction diagram showing a twelfth embodiment of the present invention.

The twelfth embodiment of the present invention will now be described with reference to a drawing. FIG. 25 is a construction diagram showing an optical rotary encoder according to the twelfth embodiment, in which the same portions as those already explained are indicated by the same reference numerals as above to omit explanation. In the same figure, the numeral 1501 denotes a track having a first pattern formed by n number of grating sectors 106, the grating sectors 106 each having a linear diffraction grating formed in the interior thereof. The track 1502 is disposed so as not to interfere with a track 1302 having a second pattern formed by a diffraction grating 1401. Numeral 1507 denotes a computing means for calculating and outputting a rotational angle of the rotary disk 501 on the basis of the output of the position detecting means 105 and that of the light intensity detector 1306.

The operation of this embodiment will now be described. The light beam emitted from the monochromatic light source 101 is condensed into a size received within each grating sector 106 by the condenser lens 102 and then enters one grating sector 106 on the rotary disk 1501. The light diffracted by the linear diffraction grating in the grating sector 106 is converged into a spot shape appropriate for the position detector 105 by the condenser lens 104 and then enters the position detector. As in the fifth embodiment, the position detection signal in the grating sector 106 represents an absolute angle in the range of the grating sector.

On the other hand, the light beam emitted from the monochromatic light source 1303 enters the track 1302 on the rotary disk 1501 through the condenser lens 1304. In this case, adjustment is made so that the incident light beam is not received within the diffraction grating 1401 of the track 1302 in the radial direction of the rotary disk 1501. The light diffracted by the diffraction grating 1401 is condensed on the light intensity detector 1306 by the condenser lens 1305 and its intensity is detected by the detector. When the rotary disk 1501 rotates, the light intensity detected by the light intensity detector 1306 represents an absolute angle of one rotation of the rotary disk 1501 as in the eleventh embodiment.

Discrimination of each grating sector 106 in the track 1502 can be done by detecting an absolute angle of one rotation of the rotary disk 1501 in an angular resolution of not higher than $2\pi/n$ radian. Therefore, by detecting an absolute angle of one rotation of the rotary disk 1501 in an angular resolution of not higher than $2\pi/n$ radian using the light intensity detector 1306 and thereby discriminating a grating sector 106, it is made possible to constitute an absolute value encoder of one rotation using the resolution of the position detector 105 as an angular resolution.

Embodiment 13

Figure 26:
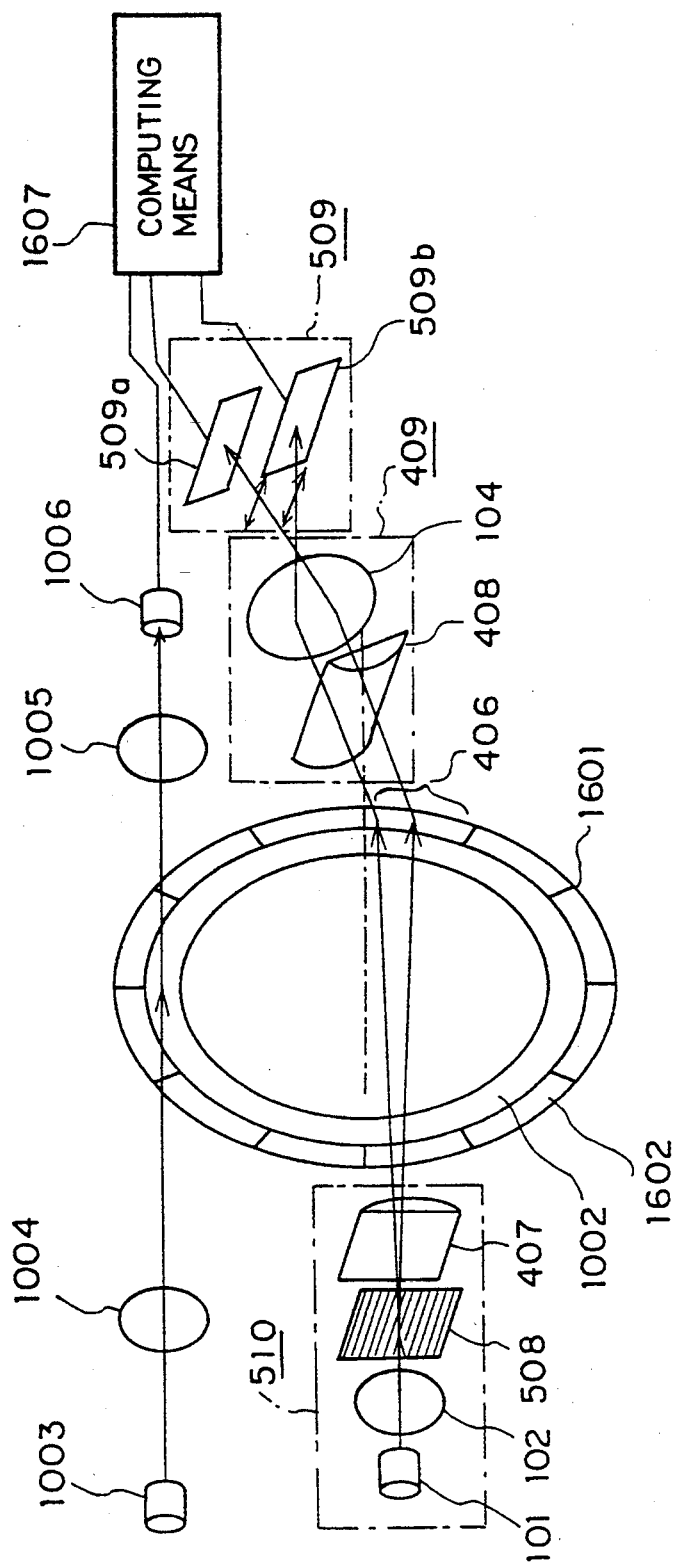
FIG. 26 is a construction diagram showing a thirteenth embodiment of the present invention.

The thirteenth embodiment of the present invention will now be described with reference to drawings. FIG. 26 is a construction diagram showing an optical rotary encoder according to the thirteenth embodiment, in which the same portions as those already explained are indicated by the same reference numerals as above to omit explanation. In the same figure, the numeral 1601 denotes a rotary disk, and numeral 1602 denotes a track having a first pattern formed by grating sectors 406, the grating sectors 406 each having a linear diffraction grating in the interior thereof which grating extends in a direction parallel to a bisector for the grating sector. The track 1602 is disposed so as not to interfere with a track 1002 having a second pattern formed by a slit 1101. Numeral 1607 denotes a computing means which selects a light spot on the basis of the intensity of transmitted light, then calculates and outputs a rotational angle of the rotary disk 1601 from the position of the thus-selected light spot.

The operation of this embodiment will now be described. As in the seventh embodiment, at least two linear spots are formed on a grating sector 406 of the rotary disk 1601 by a lighting means 510 comprising monochromatic light source 101, condenser lens 102, grating beam splitter 508 and cylindrical lens 407. A branch angle of the grating beam splitter 508 is set in such a manner that the spacing between at least two linear spots is $(2m+1)/2$ (m is an integer) times the width in the circumferential direction of the grating sector 406, or $(2\pi m+1)/n$ radian in terms of a rotational angle of the rotary disk. Two position detectors 509a and 509b of a position detecting means 509 detect the positions of two light spots formed by a cylindrical lens 408 and a condenser lens 409 as constituents of a light condensing means 409 from diffracted light beams of the two linear spots on the grating sector 406 which diffracted light beams are obtained by the linear diffraction grating.

On the other hand, the light beam emitted from the light source 1003 enters the track 1002 through the condenser lens 1004. In this case, adjustment is made so that the incident light beam is not received within the slit 1101 of the track 1002 in the radial direction of the rotary disk 1601. The transmitted light from the slit 1101 is condensed on the light intensity detector 1006 by the condenser lens 1005 and its intensity is detected by the detector. When the rotary disk 1601 rotates, the light intensity detected by the light intensity detector 1006 represents an absolute angle of one rotation of the rotary disk 1601 as in the ninth embodiment.

FIG. 27 shows a state of the encoder when rotational angle of the rotary disk 1601 is within a certain range, in which the abscissa represents the rotational angle of the rotary disk 1601. In the same figure, the numeral 1701 denotes an output of the light intensity detector 1006; numeral 1702 denotes a position detector selected on the basis of the output 1701 of the light intensity detector 1006; numeral 1703 denotes an output of the position detector 509a; numeral 1704 denotes the number, i ($0 \leq i \leq n-1$), of the grating sector which is irradiated with the light spot detected by the position detector 509a; and numeral 1705 denotes the number, $i_1$ ($0 \leq i_1 \leq n-1$), of the grating sector irradiated with the light spot detected by the position detector 509b.

The outputs 1703 and 1705 of the position detectors 509a and 509b are saw-tooth waves of a $2\pi/n$ radian cycle and are different in phase from each other by $\pi/n$ radian, or ½ cycle, The solid line portion of those outputs 1703 and 1705 indicates that the central part of the grating sector 406 is irradiated with a light spot and that the detecting ability of the positions detectors 509a and 509b is sufficient. The light spot is set so that the area occupies at least $\pi/n$ radian of each cycle. On the other hand, the broken line portion indicates that a boundary part of the grating sector 406 or the vicinity thereof is irradiated with a light spot land that the detecting ability of the position detectors 509a and 509b is insufficient, In order to eliminate a detection unfeasible area, it is necessary to select the position detectors 509a and 509b shown in 1702 so as to permit detection always in the solid line portion. Therefore, by calculation from the output 1701 of the light intensity detector 1006, it is made possible to select the position detectors 509a and 509b and eliminate a detection unfeasible area. Further, since the numbers 1704 and 1706 of the grating sector 406 irradiated with light spots can be discriminated from the output 1701 of the light intensity detector 1006, it is possible to constitute an absolute value encoder of one rotation wherein the resolution of the position detectors 509a and 509b is an angular resolution.

Embodiment 14

Figure 28:
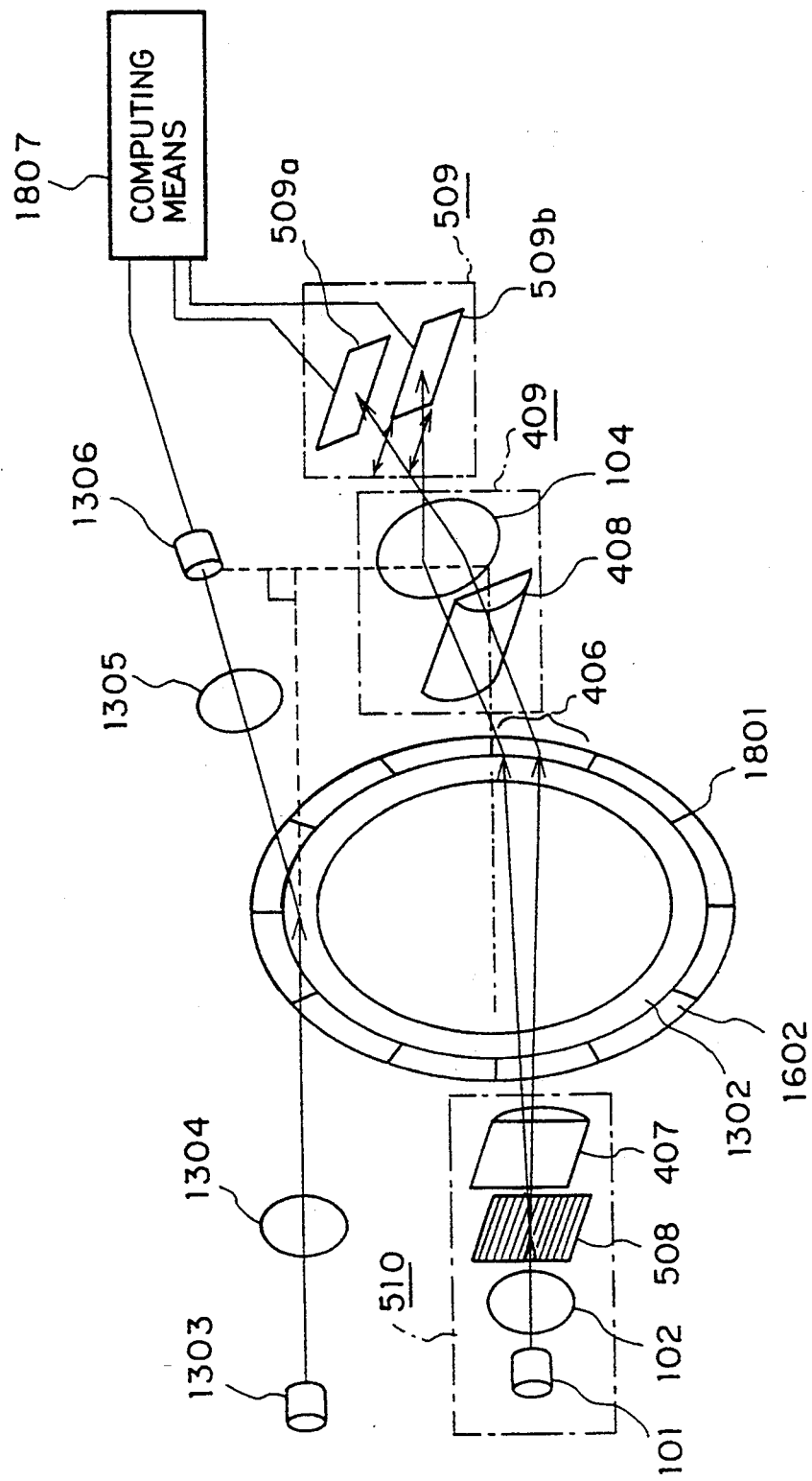
FIG. 28 is a construction diagram showing a fourteenth embodiment of the present invention.

The fourteenth embodiment of the present invention will now be described with reference to a drawing. FIG. 28 is a construction diagram showing an optical rotary encoder according to the fourteenth embodiment. This embodiment is different from the thirteenth embodiment in that a track 1302 having a first pattern formed by a diffraction grating 1401 is used in place of the track 1002 having a first pattern formed by slit 1101. At the same time, a monochromatic light source 1303 is used in place of the light source 1003; further, the condenser lenses are substituted by those indicated at 1304 and 1305 and the light intensity detector substituted by the one indicated at 1306. In FIG. 28, the numeral 1801 denotes a rotary disk and the numeral 1807 denotes a computing means which selects a light spot on the basis of the intensity of diffracted light, then calculates and outputs a rotational angle of the rotary disk 1801 from the position of the selected light spot. The operation of this embodiment is basically the same as that of the thirteenth embodiment, so an explanation thereof is here omitted.

Embodiment 15

Figure 29:
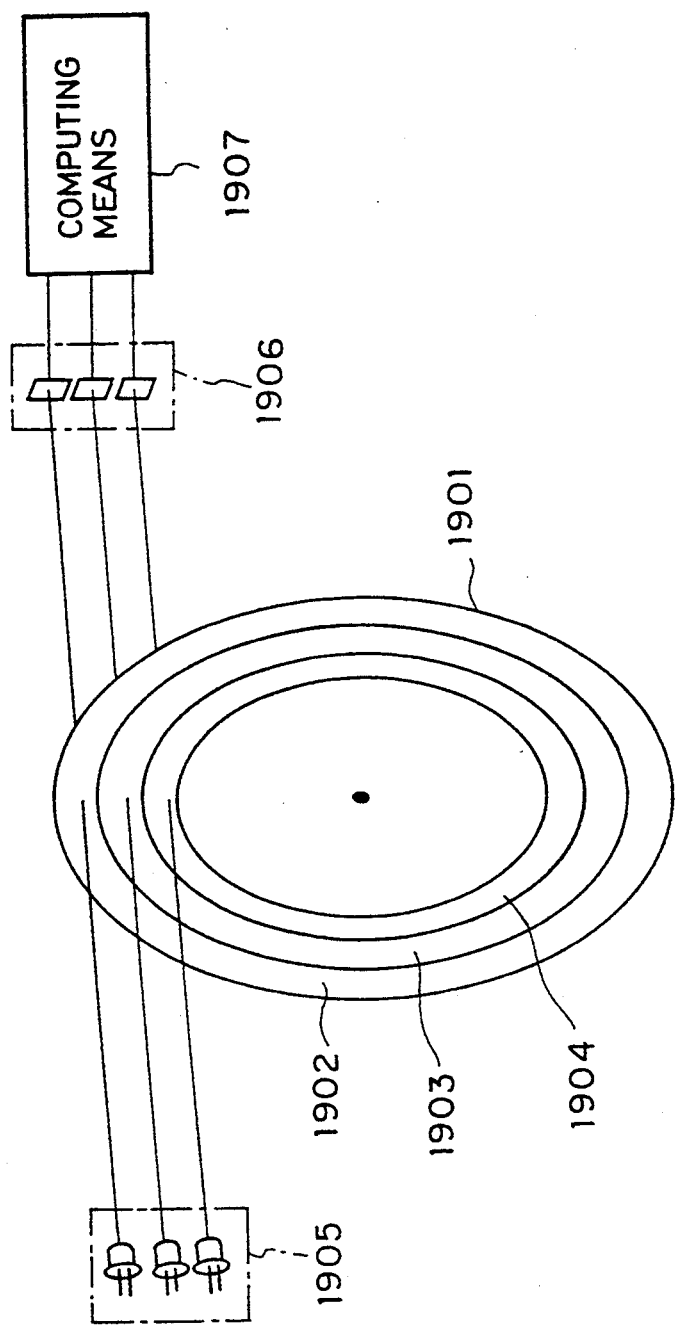
FIG. 29 is a plan view showing a rotary disk used in a fifteenth embodiment of the present invention.

The fifteenth embodiment of the present invention will now be described with reference to drawings. FIG. 29 is a construction diagram showing an optical rotary encoder according to the fifteenth embodiment. In the same figure, the numeral 1901 denotes a rotary disk; numeral 1902 denotes a first track which outputs a saw-tooth wave once per rotation of the rotary disk 1901; numeral 1903 denotes a second track which outputs a saw-tooth wave n times per rotation of the rotary disk 1901; numeral 1904 denotes a third track which outputs a saw-tooth wave n times per rotation of the rotary disk 1901, the saw-tooth wave having a phase difference of a half cycle from the saw-tooth wave outputted from the second track 1903. Numeral 1905 denotes a light emitting element which radiates light to the tracks 1902, 1903 and 1904. Numeral 1906 denotes a detecting means for detecting the outputs of the tracks 1-902, 1903 and 1904 on the basis of transmitted light quantities from those tracks. Numeral 1907 denotes a computing means for calculating and outputting a rotational angle of the rotary disk 1901 from the outputs of the tracks 1902, 1903 and 1904 detected by the detecting means 1906.

Figure 30:
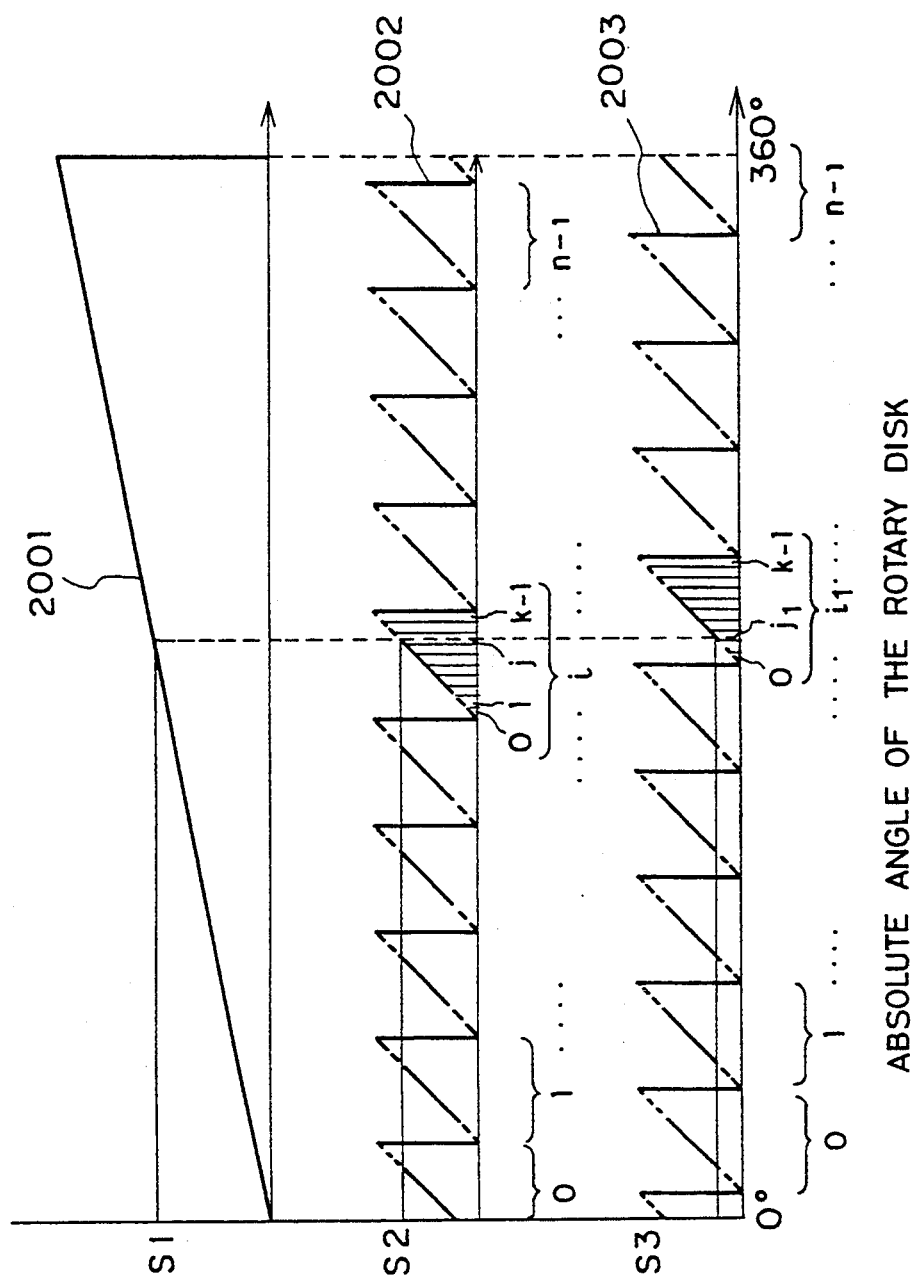
FIG. 30 is an explanatory diagram showing track outputs relative to rotation of a rotary disk in the fifteenth embodiment.

Description is now directed to the operation of this embodiment. The rotary disk 1901 irradiated with light emitted from the light emitting element 1905 outputs such three waveforms as shown in FIG. 30 from the tracks 1902, 1903 and 1904. In the same figure, the numeral 2001 denotes a saw-tooth wave which is outputted in one cycle from the first track 1902 for one rotation of the rotary disk 1901; numeral 2002 denotes a saw-tooth wave which is outputted in n cycles from the second track 1903 for one rotation of the rotary disk 1901 and which leads the saw-tooth wave 2001 in phase by a quarter of its own cycle; and numeral 2003 denotes a saw-tooth wave which is outputted in n cycles from the third track 1904 for one rotation of the rotary disk 1901 and which lags the saw-tooth wave 2001 in phase by a quarter of its own cycle. As an example in this embodiment there is shown the case where the phase difference of each of the saw-tooth waves 2002 and 2003 from the saw-tooth wave 2001 is a quarter of a cycle thereof. But the phase difference of each of the saw-tooth waves 2002 and 2003 from the saw-tooth wave 2001 is optional if only it is a half of a cycle thereof.

It is here assumed that in the waveforms of the saw-tooth waves 2002 and 2003, the portions below a quarter cycle at the start and end of each cycle indicated by dotted lines are not linear with respect to an angle and unmeasurable. However, since the saw-tooth waves 2002 and 2003 are out of phase by a half cycle with respect to each other, either the saw-tooth wave 2002 or 2003 provides a linear area with respect to a rotational angle of the rotary disk 1901. Therefore, for measuring an absolute angle of one rotation of the rotary disk 1901, either the saw-tooth wave 2002 or 2003 is selected so that the measurement can be made in the wavelength area which is linear with respect to an angle, namely, in the range of the central part or in a half cycle range, and the computing means 1907 calculates an absolute angle on the basis of the result of such selection. Since in the saw-tooth waves 2002 and 2003 the waveform area which is linear with respect to an angle is in correspondence to the angle, one of the saw-tooth waves 2002 and 2003 is selected in accordance with the value S1 of the saw-tooth wave 2001.

The following description is now provided about calculating absolute angles. In connection with the saw-tooth waves 2002 and 2003, absolute angles $j$ and $j_1$ ($0 \leq j \leq k-1$, $0 \leq j_1 \leq k-1$) are calculated at an angular resolution point k in one saw-tooth wave cycle in accordance with outputs S2 and S3 from the detecting means 1906. The k just referred to is a multiple of 4, which is not smaller than 4. In those saw-tooth waves, moreover, from $0^{th}$ to $(n-1)^{th}$ saw-tooth waves are outputted with respect to an angle, and the sequence thereof is calculated from the output S1 of the saw-tooth wave 2001. In the $i^{th}$ wave ($0 \leq i \leq n-1$) of the saw-tooth wave 2002, when the absolute angle in the cycle thereof is j, an absolute angle $\alpha$ in one rotation of the encoder is determined as follows:

$$\alpha = i \times k + j - k/4 \quad (14)$$

In the $i_1{}^{th}$ wave ($0 \leq i_1 \leq n-1$) of the saw-tooth wave 2003, when the absolute angle in the cycle thereof is $j_1$, an absolute angle $\alpha_1$ in one rotation of the encoder is determined as follows:

$$\alpha_1 = i_1 \times k + j_1 - k/2 \quad (15)$$

By the above calculations it is made possible to obtain the same absolute angle in both saw-tooth waves 2002 and 2003.

Embodiment 16

Figure 31:
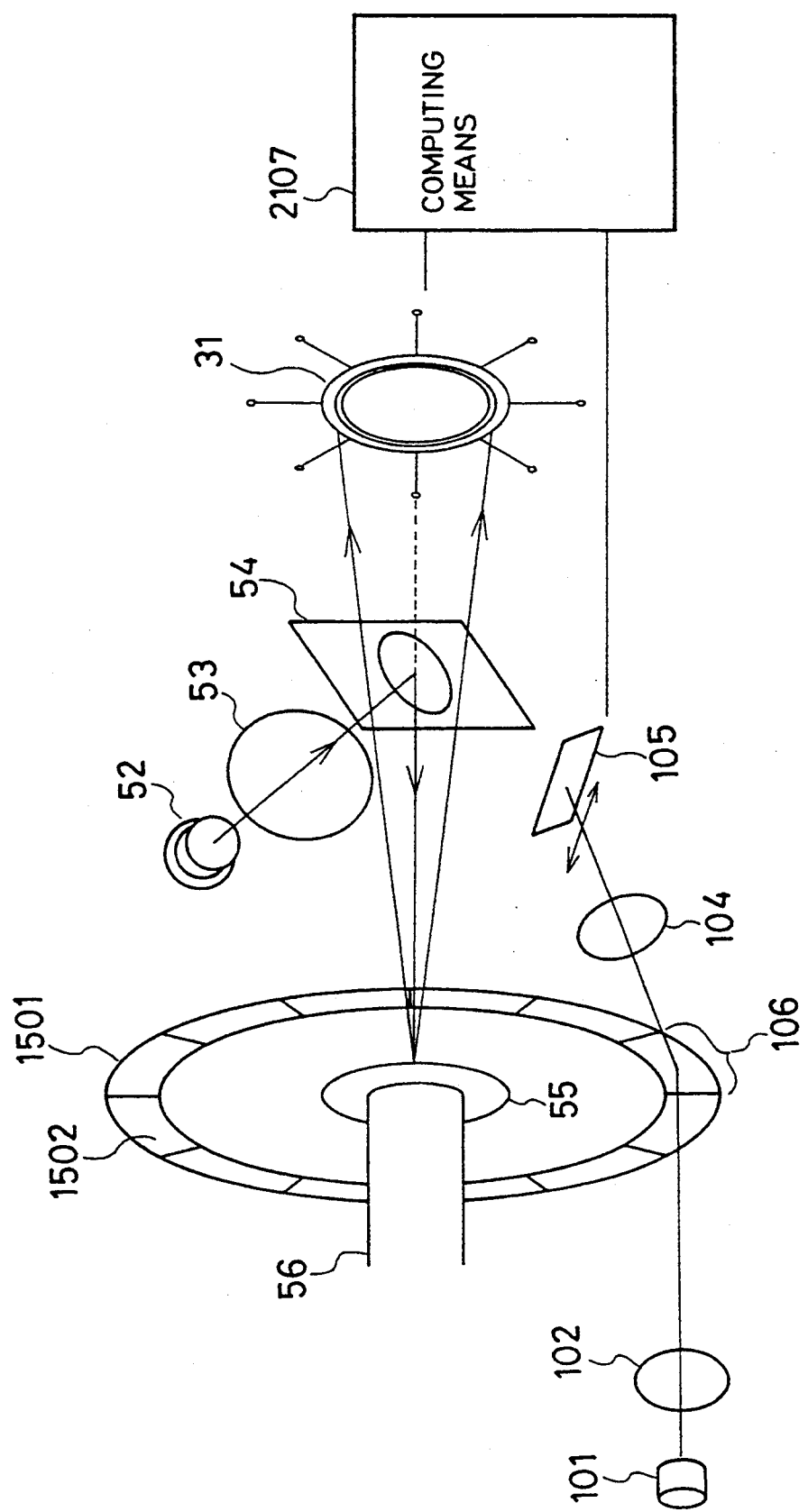
FIG. 31 is a construction diagram showing a sixteenth embodiment of the present invention.

The sixteenth embodiment of the present invention will now be described with reference to a drawing. FIG. 31 is a construction diagram showing an optical rotary encoder according to the sixteenth embodiment, in which the same portions as those already explained are indicated by the same reference numerals to omit explanation. In the same figure, the numeral 1501 denotes a rotary disk and numeral 1502 denotes a track having a first pattern formed by n number of grating sectors 106, the grating sectors 106 each having a linear diffraction grating formed in the interior thereof. On the inner periphery side of the track 1502 there is formed a second pattern which is a deflector 55. The deflector 55 deflects a radiated light in a predetermined certain direction to form an annular light spot on a plane parallel to the rotary disk 1501 in accordance with rotation of the rotary disk. Numeral 52 denotes a light source (a second lighting means) for radiating light to the deflector 55 as the second pattern; numeral 53 denotes a condenser lens; numeral 54 denotes a half mirror; numeral 56 denotes a rotating shaft; and numeral 31 denotes a position detector (a second position detecting means). The constructions of these components are the same as in the fourth embodiment. Numeral 101 denotes a monochromatic light source (a first lighting means); numerals 102 and 104 each denote a condenser lens (a light condensing means); and numeral 105 denotes a position detector using a semiconductor. The constructions of these components are the same as in the fifth embodiment. Further, the numeral 2107 denotes a computing means which calculates a rotational angle of the rotary disk 1501 on the basis of signals provided from the position detectors 105 and 31.

The operation of this embodiment will now be described. The light beam emitted from the monochromatic light source 101 is condensed into a size received within each grating sector 106 by the condenser lens 102 and then enters one grating sector 106 on the rotary disk 1501. The light diffracted by the linear diffraction grating in the grating sector 106 is converged into a spot shape appropriate for the position detector 105 by the condenser lens 104 and then enters the position detector 105, As in the fifth embodiment, the position detection signal in the grating sector 106 represents an absolute angle in the range of the same sector.

On the other hand, the light beam emitted from the light source 52 is converged by the condenser lens 53 and enters the half mirror 54. Then, the light beam reflected by the half mirror 54 enters the deflector 55, whereby it is deflected and reflected in a certain direction relative to the deflector. The light beam thus reflected again enters the half mirror 54 and transmitted light enters the position detector 31. As mentioned in the fourth embodiment, the position of the light spot formed on the position detector 31 is in correspondence to a rotational angle of the rotating shaft 56, so it is detected by the position detecting method described in the second embodiment or the third embodiment and is outputted as an absolute rotational angle.

Discrimination of a grating sector 106 in the track 1502 can be done by detecting an absolute angle of one rotation of the rotary disk 1501 in an angular resolution of not higher than $2\pi/n$ radian. Thus, by making discrimination in such a manner it is made possible to constitute an absolute value encoder of one rotation in which the resolution of the position detector 105 is an angular resolution.

What is claimed is:

1. A position detector comprising:
   a flat plate-like photodiode formed in the shape of a ring;
   a resistor disposed along the outer periphery of said photodiode and concentrically with the photodiode;
   at least two output electrodes attached to said resistor at equal angular intervals; and
   fine narrow electrically conductive layers projecting from said resistor onto said photodiode radially at equal angular intervals so as to subdivide the angular spacing between adjacent said output electrodes, said electrically conductive layers being provided in a larger number than said output electrodes.

2. A position detecting method for detecting the position of a light spot incident on a flat plate-like photodiode formed in the shape of a ring, using a position detector comprising said photodiode, a resistor disposed concentrically along the outer periphery of said photodiode, output electrodes attached to said resistor at equal angular intervals, said output electrodes being provided in a number corresponding to a multiple of 4, and a plurality of fine narrow electrically conductive layers projecting from said resistor radially at equal angular intervals onto said photodiode, said method comprising the steps of:

selecting a pair of opposed output electrodes and a pair of output electrodes opposed to said paired output electrodes at an angle of 90 degrees, from among said output electrodes of said position detector;

measuring an electric current value based on the incidence of said light spot in each of the selected output electrodes;

dividing a difference between the measured current values in each said pair of output electrodes by the sum of both current values; and detecting an incident position of said light spot on the basis of the resulting two quotients.

3. A position detecting method for detecting the position of a light spot incident on a flat plate-like photodiode formed in the shape of a ring, using a position detector comprising said photodiode, a resistor disposed concentrically along the outer periphery of said photodiode, output electrodes attached to said resistor at equal angular intervals, said output electrodes being provided in a number corresponding to a multiple of 4 and not less than 8, and a plurality of fine narrow electrically conductive layers projecting from said resistor radially at equal angular intervals onto said photodiode, said method comprising the steps of:

selecting a pair of opposed output electrodes and a pair of output electrodes opposed to said paired output electrodes at an angle of 90 degrees, from among said output electrodes of said position detector;

measuring an electric current value based on the incidence of said light spot in each of the selected output electrodes;

dividing a difference between the measured current values in each said pair of output electrodes by the sum of both current values;

determining a rough incident position of said light spot on the basis of the resulting two quotients;

then, with respect to one of said output electrodes closest to said rough position, selecting a pair of said output electrodes disposed on both sides of said closest output electrode;

measuring an electric current value based on the incidence of said light spot in each of said selected output electrodes;

dividing a difference between the measured current values in said selected output electrodes by the sum of both current values; and detecting an incident position of said light spot on the basis of the resulting quotient.

4. An optical rotary encoder comprising:

a rotary member for deflecting light emitted from a light source and forming a light spot which moves on an annular path in correspondence to a rotational angle of said rotary member;

a position detector disposed so that the light spot formed by said rotary member moves on a flat plate-like photodiode formed in the shape of a ring, said position detector comprising said photodiode, a resistor disposed concentrically along the outer periphery of said photodiode, output electrodes attached to said resistor at equal angular intervals, said output electrodes being provided in a number corresponding to a multiple of 4, and a plurality of fine narrow electrically conductive layers projecting from said resistor onto said photodiode radially at equal angular intervals; and a position detecting means which selects two pairs of output electrodes opposed to each other at an angle of 90 degrees from among the output electrodes of said position detector, measures an electric current value generated in each of the selected output electrodes upon incidence of the light spot on said photodiode and detects an incident position of the light spot on the basis of the measured values.

* * * * *